(12) United States Patent
Takeuchi et al.

(10) Patent No.: US 9,975,458 B2
(45) Date of Patent: May 22, 2018

(54) VEHICLE SEAT APPARATUS

(71) Applicants: Eishi Takeuchi, Nagoya (JP); Kohshi Katoh, Hadano (JP); Koki Kunugi, Susono (JP)

(72) Inventors: Eishi Takeuchi, Nagoya (JP); Kohshi Katoh, Hadano (JP); Koki Kunugi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 299 days.

(21) Appl. No.: 14/759,789

(22) PCT Filed: Jan. 7, 2014

(86) PCT No.: PCT/IB2014/000008
§ 371 (c)(1),
(2) Date: Jul. 8, 2015

(87) PCT Pub. No.: WO2014/108790
PCT Pub. Date: Jul. 17, 2014

(65) Prior Publication Data
US 2015/0343924 A1 Dec. 3, 2015

(30) Foreign Application Priority Data
Jan. 10, 2013 (JP) ................................. 2013-002678

(51) Int. Cl.
*B60N 2/39* (2006.01)
*B60N 2/02* (2006.01)

(52) U.S. Cl.
CPC .......... *B60N 2/39* (2013.01); *B60N 2002/026* (2013.01); *B60N 2002/0208* (2013.01)

(58) Field of Classification Search
CPC .... B60N 2002/0208; B60N 2002/0212; B60N 2002/022; B60N 2/22
See application file for complete search history.

(56) References Cited

U.S. PATENT DOCUMENTS

| 148,380 | A | * | 3/1874 | Perrenet | A47C 1/032 |
| | | | | | 297/352 |
| 3,552,797 | A | * | 1/1971 | D'Houdain | A47C 7/42 |
| | | | | | 297/354.1 |
| 5,588,704 | A | * | 12/1996 | Harza | A47C 3/0255 |
| | | | | | 297/314 |

(Continued)

FOREIGN PATENT DOCUMENTS

DE 102008064466 A1 7/2010
GB 2313214 A 11/1997
(Continued)

*Primary Examiner* — Timothy J Brindley
(74) *Attorney, Agent, or Firm* — Hunton Andrews Kurth LLP

(57) ABSTRACT

A vehicle seat apparatus includes a seat portion, a seatback arranged on a rear side of the seat portion, a seat portion supporting mechanism that supports the seat portion such that a right side and a left side of the seat portion are able to move relative to one another in a vertical direction of the vehicle seat apparatus, and a seat portion restoring force generating mechanism that generates a restoring force that returns the seat portion to an original position when the seat portion rotates.

10 Claims, 27 Drawing Sheets

(56) References Cited

U.S. PATENT DOCUMENTS

| | | | | |
|---|---|---|---|---|
| 5,769,492 | A * | 6/1998 | Jensen | A47C 9/002 297/188.09 |
| 6,059,363 | A * | 5/2000 | Roslund, Jr. | A47C 1/03255 297/301.4 |
| 6,866,340 | B1 * | 3/2005 | Robertshaw | A47C 7/024 297/312 |
| 7,416,251 | B2 * | 8/2008 | Chu | A47C 7/448 297/285 |
| 7,543,792 | B1 | 6/2009 | Ursel | |
| 7,637,570 | B2 * | 12/2009 | Becker | A47C 7/28 297/312 |
| 7,806,479 | B2 * | 10/2010 | Jensen | A47C 9/002 248/158 |
| 8,662,585 | B2 * | 3/2014 | Garvis | G09B 9/12 297/314 |
| 9,114,880 | B2 * | 8/2015 | Guering | A47C 7/405 |
| 9,713,380 | B2 * | 7/2017 | Gehner | A47C 7/14 |
| 2004/0195882 | A1 * | 10/2004 | White | A47C 4/02 297/284.3 |
| 2005/0173952 | A1 * | 8/2005 | Van Der Laan | A47C 15/004 297/217.3 |
| 2008/0097254 | A1 * | 4/2008 | Torres | A61G 5/045 601/23 |
| 2010/0117427 | A1 * | 5/2010 | Fukuyama | A61H 9/0078 297/338 |
| 2014/0159455 | A1 * | 6/2014 | Thomaschewski | B60N 2/643 297/353 |
| 2014/0191550 | A1 | 7/2014 | Katoh | |
| 2015/0061338 | A1 * | 3/2015 | Nagayasu | B60N 2/449 297/353 |
| 2015/0239381 | A1 * | 8/2015 | Hamabe | B60N 2/7094 297/313 |
| 2015/0266448 | A1 * | 9/2015 | Aoki | B60R 22/20 297/313 |
| 2015/0367756 | A1 * | 12/2015 | Katoh | B60N 2/666 297/285 |
| 2016/0095443 | A1 * | 4/2016 | Brodbeck | A47C 7/40 297/301.1 |
| 2016/0152166 | A1 * | 6/2016 | Lorenz | B60N 2/4415 297/257 |
| 2016/0159254 | A1 * | 6/2016 | Katoh | A47C 1/024 297/313 |

FOREIGN PATENT DOCUMENTS

| | | |
|---|---|---|
| JP | 58-097040 U | 7/1983 |
| JP | 2001-277913 A | 10/2001 |
| JP | 2003-516267 A | 5/2003 |
| JP | 2008302795 A | 12/2006 |
| JP | 2008-044418 A | 2/2008 |
| WO | 02/064398 A1 | 8/2002 |
| WO | 2007/016625 A1 | 2/2007 |
| WO | 2013/021497 A1 | 2/2013 |

* cited by examiner

F I G . 13
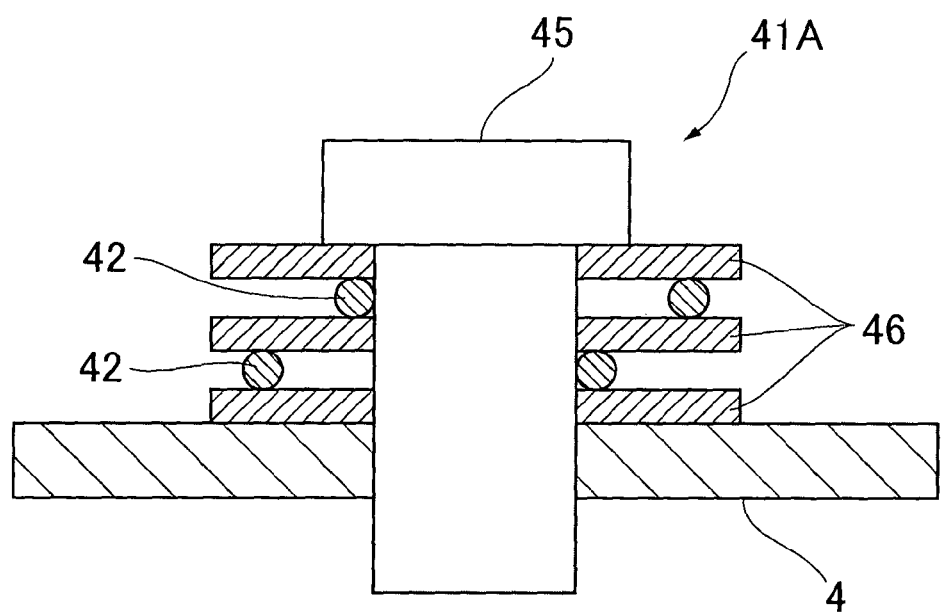

F I G . 15
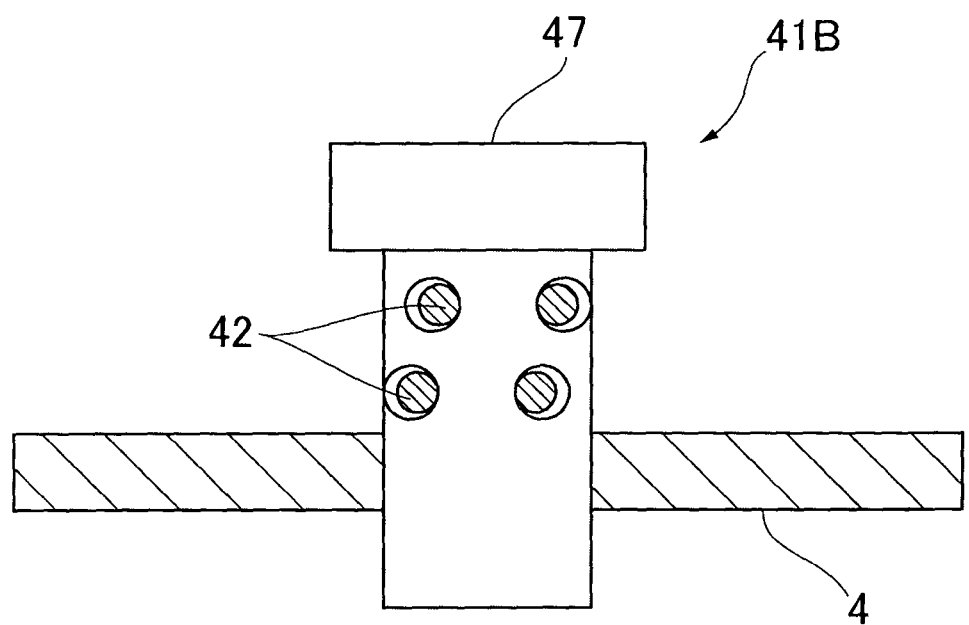

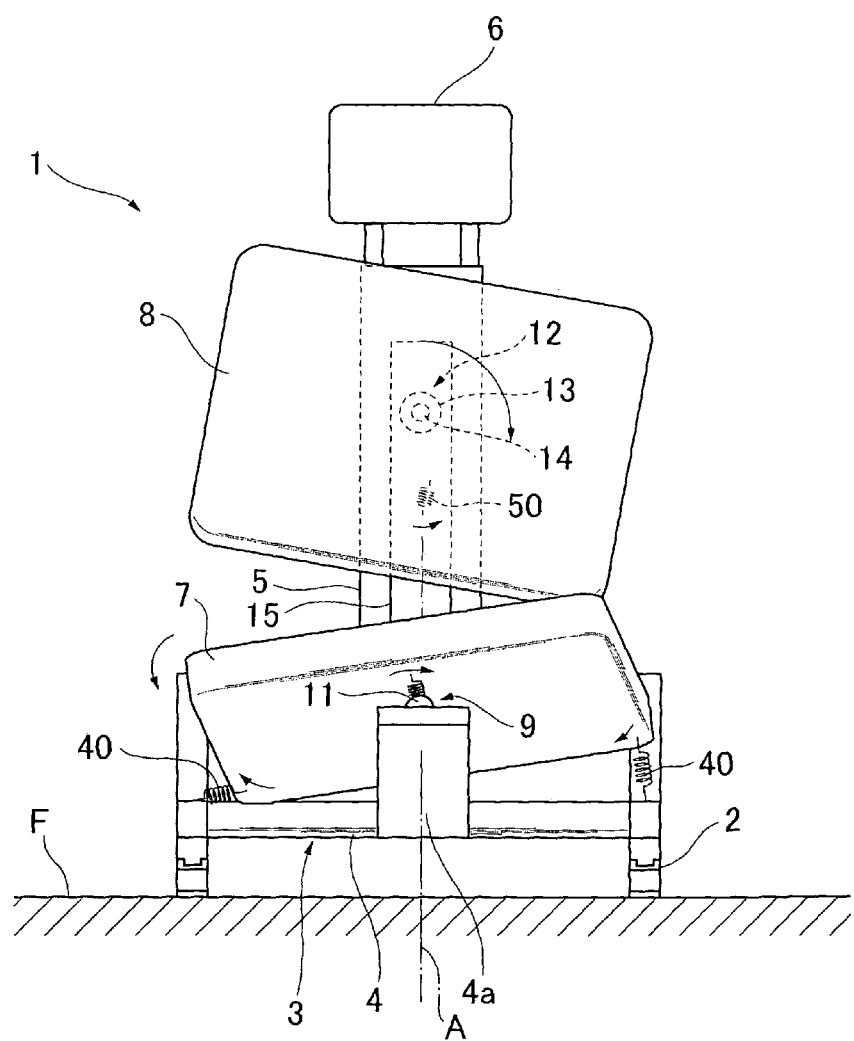
F I G . 22

VEHICLE SEAT APPARATUS

CROSS-REFERENCE TO RELATED APPLICATIONS

This is a national phase application based on the PCT International Patent Application No. PCT/IB2014/000008 filed Jan. 7, 2014, claiming priority to Japanese Patent Application No. 2013-002678 filed Jan. 10, 2013, the entire contents of both of which are incorporated herein by reference.

BACKGROUND OF THE INVENTION

1. Field of the Invention

The invention relates to a vehicle seat apparatus that includes a seat portion and a seatback.

2. Description of Related Art

Published Japanese Translation of PCT application No. 2003-516267 (JP 2003-516267 A) describes a related vehicle seat apparatus. The technology described in JP 2003-516267 A is such that a frame structure of a vehicle seat is able to be adjusted in a spherical manner within two planes that are isolated from each other, by a lift element.

However, the technology described in JP 2003-516267 A only considers a lateral load that acts on an occupant when driving around a curve. Also, with the technology described in JP 2003-516267 A, the lift element is driven by a drive motor, so the vehicle seat is unable to be moved in line with the intentions of the occupant. Therefore, there is room for improvement in terms of improving steering operability and the ability to maintain a posture of the occupant when turning, and the like.

Thus, the applicant of this specification has proposed a vehicle seat apparatus capable of making it easier for an occupant to maintain a posture when turning, in PTC application (PCT/JP2011/068326) filed earlier.

That is, it is known that most movement of a person can be performed more easily and efficiently by starting at the lumbar region (i.e., the lower back), and moving the lumbar region in various directions. For example, with running, a person is able to easily run fast by bending and rotating the lumbar region, and moving the pelvis and the scapula (shoulder blades) in opposite directions. Also, for example, in karate as well, a punch can be delivered with speed and power by bending and twisting the lumbar region, and moving the pelvis and the scapula in opposite directions.

However, a driver is seated in a seat that is fixed to a vehicle, so the lumbar region is fixed. Therefore, the driver must perform driving operations with his or her lumbar region, which is the starting point for natural movement, fixed.

For example, when performing a steering operation, the driver is unable to move the pelvis and the scapula in opposite directions with the lumbar region as the starting point, so the steering wheel must be turned using only the strength of the arms. However, arm muscles have less stamina than the trunk muscles of the lumbar region, so when turning the steering wheel using only the strength of the arms, the arms will easily become fatigued. Moreover, unlike natural movement that starts at the lumbar region, the arms are moved in an unnatural posture in which the lumbar region is fixed, so the shoulders and neck will also easily become fatigued.

Further, the trunk muscles are unable to be used effectively (i.e., unable to generate much power) when the lumbar region is fixed, so lateral rigidity becomes extremely low.

Therefore, the driver is forced to rely on side supports of the seat to withstand lateral force acting toward the outside in the direction in which the vehicle is turning, which leads to an increase in weight and size of the seat.

Also, when the lumbar region continues to be fixed for extended periods of time, the trunk muscles of the lumbar region become extremely weak, which leads to back pain. The three major diseases of taxi drivers are lower back pain, hemorrhoids, and gastric ulcers (stomach ulcers), but the cause of these is said to be muscular weakness of the trunk muscles due to driving a vehicle for extended periods of time.

Given this situation, in PCT application (PCT/JP2011/068326) filed earlier, this issue is resolved by making the seat portion of the vehicle seat apparatus movable.

However, when the seat portion of the vehicle seat apparatus is made movable, the posture of the occupant during a turn is able to be easily maintained, but after the turn is finished, the seat portion that has moved may not return to the original position, so the posture of the occupant may not return to the original state.

SUMMARY OF THE INVENTION

The invention thus provides a vehicle seat apparatus capable of easily maintaining the posture of an occupant during a turn, and then returning the posture of the occupant to the original state after the turn is finished.

One aspect of the invention relates to a vehicle seat apparatus that includes a seat portion; a seatback arranged to a rear of the seat portion; a seat portion supporting portion that supports the seat portion such that a right side and a left side of the seat portion are able to move relative to one another in a vertical direction of the vehicle seat apparatus; and a seat portion restoring force generating mechanism that generates a restoring force that returns the seat portion to an original position when the seat portion moves.

According to the vehicle seat apparatus of this aspect of the invention, the left and right sides of the pelvis of the occupant are able to be moved relative to one another in the vertical direction of the vehicle seat apparatus by bending the lumbar spine in the left and right directions. As a result, the occupant is able to consciously or unconsciously assume a posture that enables a steering operation to be performed easily, and a posture that can be well maintained when turning, so the ability of the occupant to maintain a posture is able to be improved. Moreover, after a steering operation is performed and the vehicle has been turned, the moved seat portion is able to be returned to its original position by the restoring force generated by the seat portion restoring force generating mechanism. Therefore, the posture of the occupant is able to be returned to the original state before the steering operation.

The seat portion restoring force generating mechanism may be an elastic member that is connected to the seat portion and a non-moving portion that supports the seat portion.

This enables restoring force that returns the seat portion to its original position to be easily generated by a simple structure.

The seat portion supporting portion may rotatably support the seat portion in a roll direction of a vehicle.

Rotatably supporting the seat portion in the roll direction of the vehicle in this way enables the pelvis of the occupant to move naturally when a steering operation is performed.

As a result, movement of the lumbar region that moves the pelvis using the trunk muscles is able to be performed smoothly.

The seat portion supporting portion may support the seat portion such that the right side and the left side of the seat portion move relative to one another in a longitudinal direction of the vehicle seat apparatus.

This enables the occupant to move the right side and the left side of the pelvis relative to one another in the longitudinal direction of the vehicle seat apparatus by twisting the lumbar spine. As a result, the occupant is able to consciously or unconsciously assume a posture that enables a steering operation to be performed easily, and a posture that can be well maintained when turning, so the ability of the occupant to maintain his or her posture is able to be further improved.

The seat portion supporting portion may rotatably support the seat portion in a yaw direction of a vehicle.

Rotatably supporting the seat portion in the yaw direction of the vehicle in this way enables the pelvis of the occupant to move naturally when a steering operation is performed. As a result, movement of the lumbar region that moves the pelvis using the trunk muscles is able to be performed smoothly.

A rotational axis of the seat portion, which extends from the seat portion supporting portion, may be higher at a rear than at a front in a longitudinal direction of the vehicle seat apparatus.

The lumbar spine of a person is inclined to the rear, so setting the rotational axis of the seat portion such that the rear is higher than the front in the longitudinal direction of the vehicle seat apparatus enables the lumbar spine to bend and twist easily. As a result, the steering operability by the occupant is able to be further improved.

A rotational axis of the seat portion, which extends from the seat portion supporting portion, the seat portion supporting portion may pass through an area near a chest of an occupant seated in the vehicle seat apparatus.

The pelvis often moves mainly with the lumbar spine as the central axis, so having the rotational axis of the seat portion pass through an area near the chest of the occupant enables the lumbar spine to bend and twist even more easily. As a result, the steering operability by the occupant is able to be even further improved.

The vehicle seat apparatus described above may also include a seatback supporting portion that supports the seatback such that a right side and a left side of the seatback are able to move relative to one another in a vertical direction of the vehicle seat apparatus; and a seatback restoring force generating mechanism that generates a restoring force that returns the seatback to an original position when the seatback moves.

This enables the left side and the right side of the scapula of the occupant to be moved relative to one another in the vertical direction of the vehicle seat apparatus by bending the lumbar spine in, the left and right directions. Therefore, the occupant is able to consciously or unconsciously assume a posture that enables a steering operation to be performed easily, and a posture that can be well maintained when turning, so the ability of the occupant to maintain his or her posture is able to be improved. Moreover, after a steering operation is performed and the vehicle has been turned, the moved seatback is able to be returned to its original position by the restoring force generated by the seatback restoring force generating mechanism. Therefore, the posture of the occupant is able to be returned to the original state before the steering operation.

The seatback restoring force generating mechanism may be an elastic member that is connected, to the seatback and a non-movable member that supports the seatback.

This enables restoring force that returns the seatback to its original position to be easily generated by a simple structure.

The seatback supporting portion may rotatably support the seatback in a roll direction of a vehicle.

Rotatably supporting the seatback in the roll direction of the vehicle in this way enables the scapula of the occupant to move naturally when a steering operation is performed. As a result, movement of the lumbar region that moves the scapula using the trunk muscles is able to be performed smoothly.

The vehicle seat apparatus described above may also include a moving direction restricting portion that rotates the seat portion and the seatback in opposite directions when viewed from above. The seatback supporting portion may support the seatback such that the right side and the left side of the seatback move relative to one another in a longitudinal direction of the vehicle seat apparatus.

This enables the occupant to move the right side and the left side of the scapula relative to one another in the longitudinal direction of the vehicle seat apparatus by twisting the lumbar spine. As a result, the occupant is able to consciously or unconsciously assume a posture that enables a steering operation to be performed easily, and a posture that can be well maintained when turning. Moreover, the occupant is always able to rotate the pelvis and the scapula in opposite directions in the yaw direction. This posture becomes the optimum movement from the viewpoint of the theorem of conservation of angular momentum of the pelvis and the shoulders, so the steering operability by the occupant is able to be further improved.

The seatback supporting portion may rotatably support the seatback in a yaw direction of a vehicle.

Rotatably supporting the seatback in the yaw direction of the vehicle in this way enables the scapula of the occupant to move naturally when a steering operation is performed. As a result, movement of the lumbar region that moves the scapula using the trunk muscles is able to be performed smoothly.

A rotational axis of the seatback according to the seatback supporting portion may pass through an area near a chest of an occupant seated in the vehicle seat apparatus.

The scapula often move mainly with the thoracic vertebrae or the lumbar spine as the central axis, so having the rotational axis of the seatback pass through an area near the chest of the occupant enables the lumbar spine to bend and twist even more easily. As a result, the steering operability by the occupant is able to be even further improved.

The structure described above makes it possible to easily maintain the posture of an occupant during a turn, and then return the posture of the occupant to the original state after the turn is finished.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a sectional view taken along line XIII-XIII shown in FIG. 12;

FIG. 15 is a sectional view taken along line XV-XV shown in FIG. 14;

FIG. 22 is a front view schematically showing the vehicle seat apparatus in which the rotating shaft of the seat portion supporting mechanism is rotated to the left when viewed from the front;

DETAILED DESCRIPTION OF EMBODIMENTS

Figure 1A:
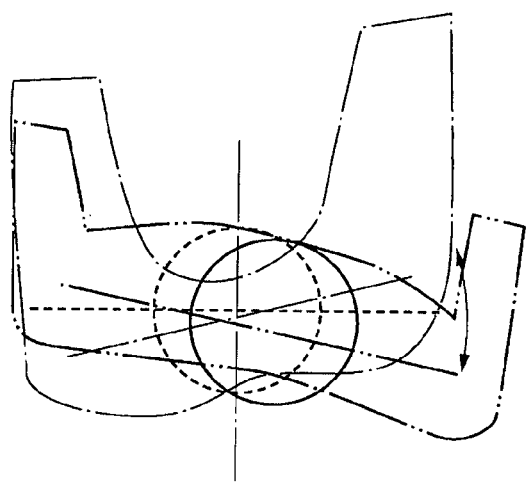
FIG. 1A is a plan view of a driver, which illustrates the way the trunk of the driver should move when a vehicle turns to the right.

Hereinafter, example embodiments of the vehicle seat apparatus according to the invention will be described with reference to the accompanying drawings. In the drawings, like and corresponding elements will be denoted by like reference characters, and redundant descriptions will be omitted.

The vehicle seat apparatus according to the example embodiments is a driver's seat that is mounted in a vehicle, and in which a driver of the vehicle sits. Therefore, the longitudinal (front and rear), vertical (up and down), and lateral (left and right) directions of the vehicle seat apparatus according to the example embodiments are the same as the longitudinal, vertical, and lateral directions of the vehicle. Therefore, the directions of vertical, lateral, and longitudinal in the description of the example embodiments refer to the directions of both the vehicle and the vehicle seat apparatus. In the example embodiments, the vehicle seat apparatus of the driver's seat is described, but the vehicle seat apparatus may also be for a seat other than the driver's seat, such as a passenger's seat.

Figure 1B:
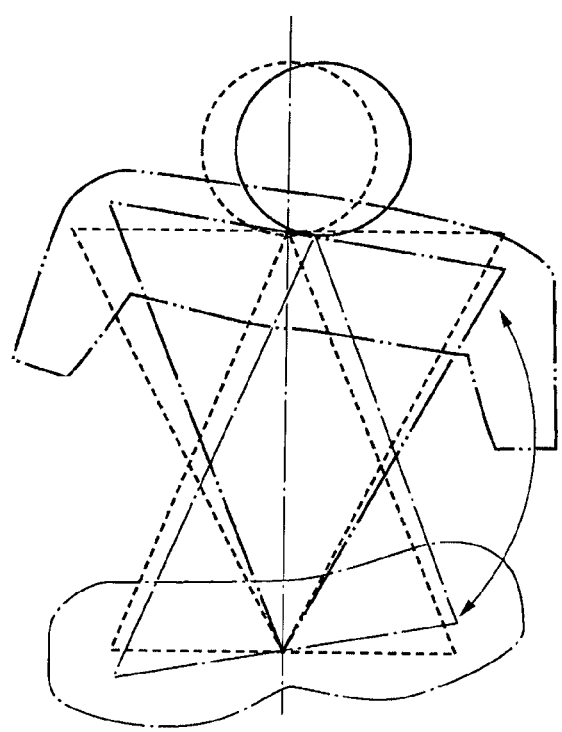
FIG. 1B is a rear view of the driver, which illustrates the way the trunk of the driver should move when the vehicle turns to the right.
Figure 2A:
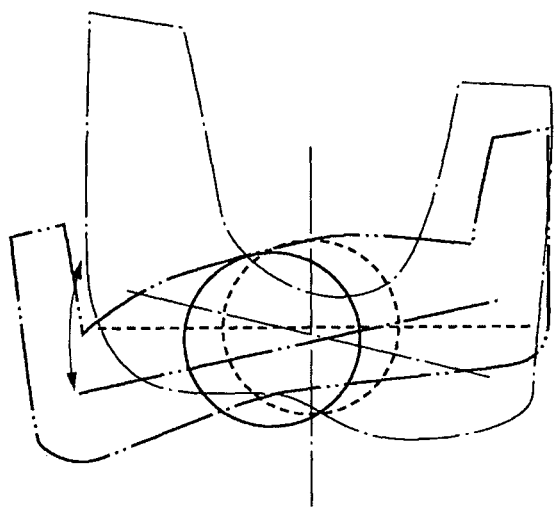
FIG. 2A is a plan view of the driver, which illustrates the way the trunk of the driver should move when the vehicle turns to the left.
Figure 2B:
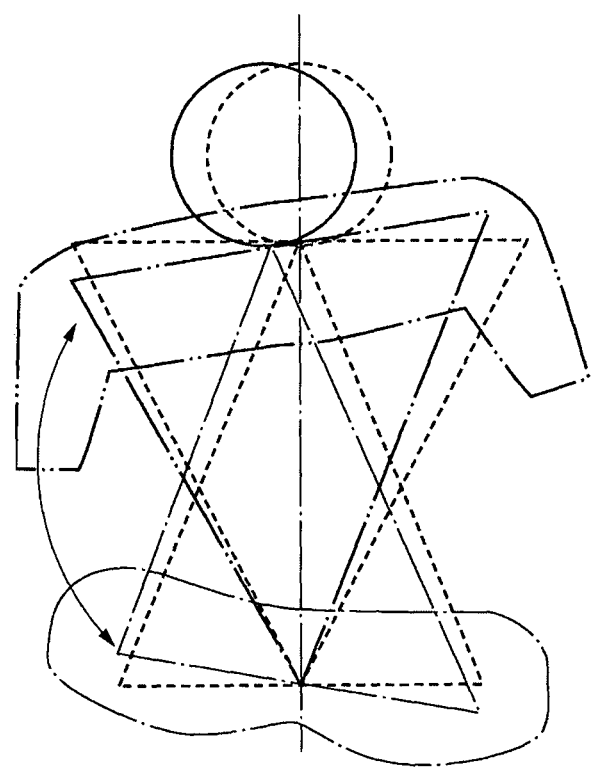
FIG. 2B is a rear view of the driver, which illustrates the way the trunk of the driver should move when the vehicle turns to the left.

First, before describing the vehicle seat apparatus according to the example embodiments, the ideal movement of the driver when the driver performs a steering operation will be described with reference to FIGS. 1 and 2. FIG. 1A is a plan view of the driver, which illustrates the way the trunk of the driver should move when the vehicle turns to the right, and FIG. 1B is a rear view of the driver, which illustrates the way the trunk of the driver should move when the vehicle turns to the right. FIG. 2A is a plan view of the driver, which illustrates the way the trunk of the driver should move when the vehicle turns to the left, and FIG. 2B is a rear view of the driver, which illustrates the way the trunk of the driver should move when the vehicle turns to the left.

A driver that is trying to turn a vehicle performs a steering operation that involves steering in the direction of the turn using arms that are connected to shoulders. In this steeling operation, the driver rotates his or her shoulders in the roll direction of the vehicle (rotating movement), moving the shoulder that is on the inside in the turning direction (i.e., on the side in the same direction as the turning direction) relatively downward in the vertical direction of the vehicle seat apparatus with respect to the shoulder that is on the outside in the turning direction (i.e., on the side in the direction opposite the turning direction). At the same time, the driver rotates the shoulders in the yaw direction of the vehicle, moving the shoulder that is on the inside in the turning direction relatively back in the longitudinal direction of the vehicle seat apparatus with respect to the shoulder, that is on the outside in the turning direction. The driver then maintains this posture until the vehicle is finished turning. Here, the shoulder refers to a section of the body from the scapula to the shoulder.

However, considering the theorem of conservation of angular momentum of the pelvis and the shoulders, a steering operation can be performed easily by a driver that is attempting to turn the vehicle to the right assuming the posture shown in FIG. 1, and a driver that is attempting to turn the vehicle to the left assuming the posture shown in FIG. 2, and these postures can be maintained.

The posture shown in FIGS. 1A and 1B is a posture in which the lumbar spine is bent, and the distance between the shoulder and the pelvis on the inside in the turning direction of the vehicle is shorter than the distance between the shoulder and the pelvis on the outside in the turning direction of the vehicle. This posture is a posture in which the pelvis and the shoulders move in opposite directions in the roll direction of the vehicle, with the lumbar spine as the axis, and is the optimum posture in view of the theorem of conservation of angular momentum of the pelvis and the shoulders in the roll direction. The theorem of conservation of angular momentum of the pelvis and the shoulders in the roll direction can be expressed by expression (1) below, when the moment of inertia in the roll direction is Ir, and the angular velocity is ω.

$$Ir\omega = \text{constant} \quad (1)$$

The posture shown in FIGS. 1B and 2B is a posture in which the lumbar spine is twisted and the pelvis and the shoulders are rotated in opposite directions. This posture is a posture in which the pelvis and the shoulders are moved in opposite directions in the yaw direction of the vehicle, with the lumbar spine as the axis, and is the optimum posture in view of the theorem of conservation of angular momentum of the pelvis and the shoulders in the yaw direction. The theorem of conservation of angular momentum of the pelvis and the shoulders in the yaw direction can be expressed by expression (2) below, when the moment of inertia in the yaw direction is Iy, and the angular velocity is ω.

$$Iy\omega = \text{constant} \quad (2)$$

Therefore, with the vehicle seat apparatus according to the example embodiments, the driver is able to assume the postures shown in FIGS. 1 and 2 when the vehicle turns, by enabling the pelvis and the scapula of the driver to rotate (move).

The vehicle seat apparatus according to the example embodiments will now be described in detail.

First Example Embodiment

Figure 3:
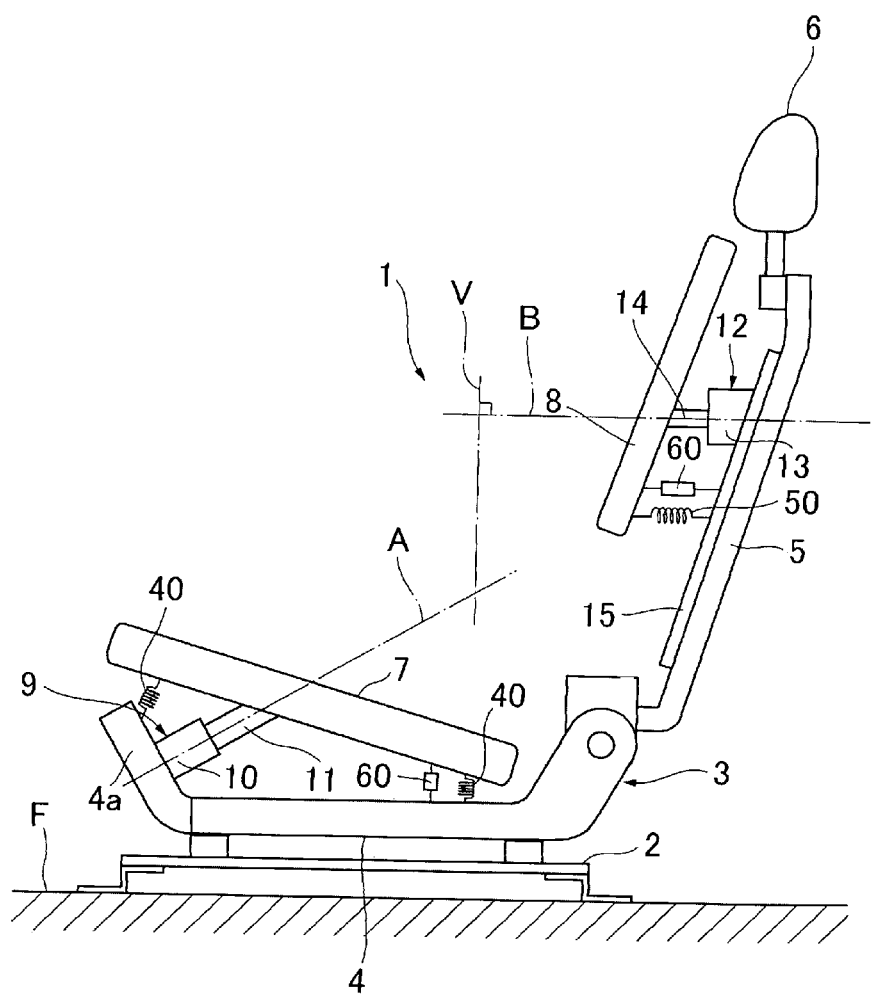
FIG. 3 is a side view schematically showing a vehicle seat apparatus according to a first example embodiment of the invention.
Figure 4:
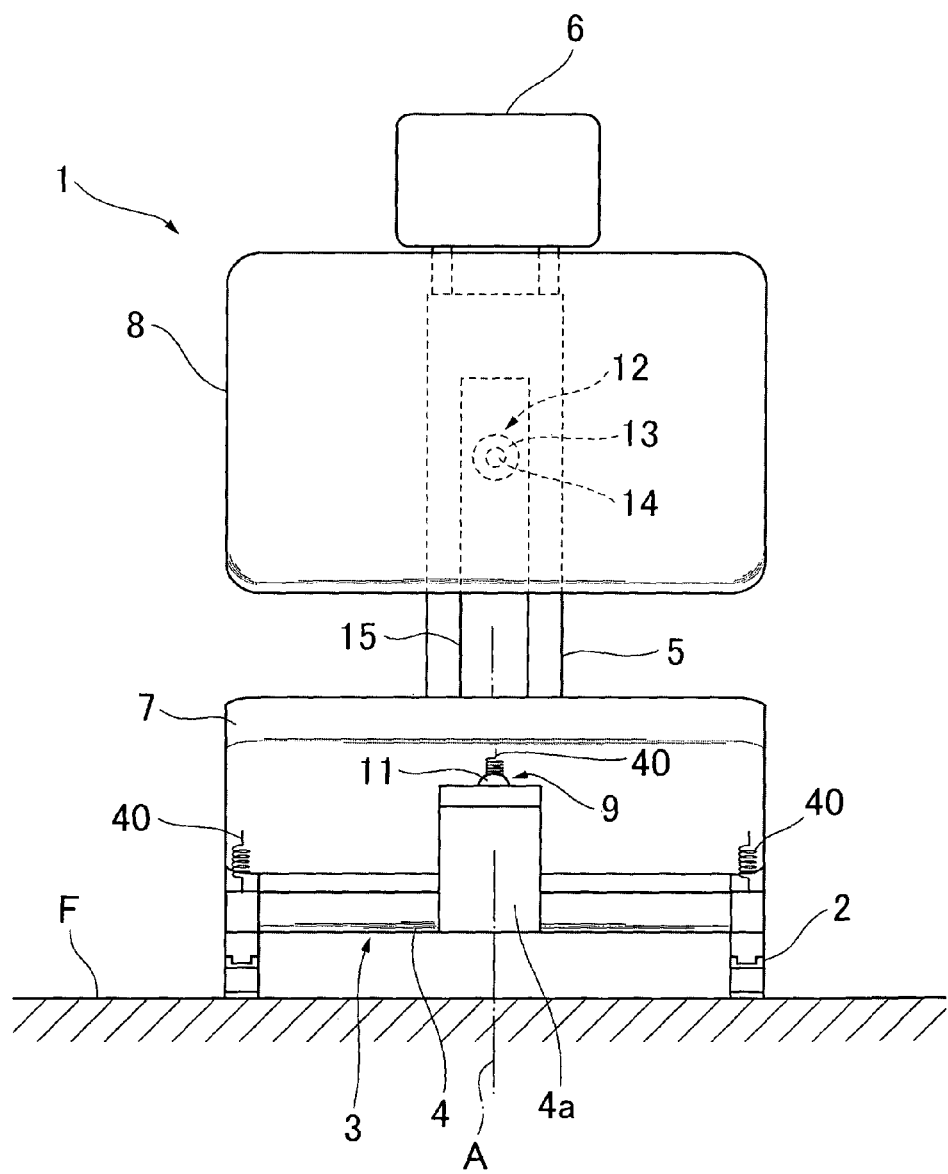
FIG. 4 is a front view schematically showing the vehicle seat apparatus according to the first example embodiment.
Figure 5:
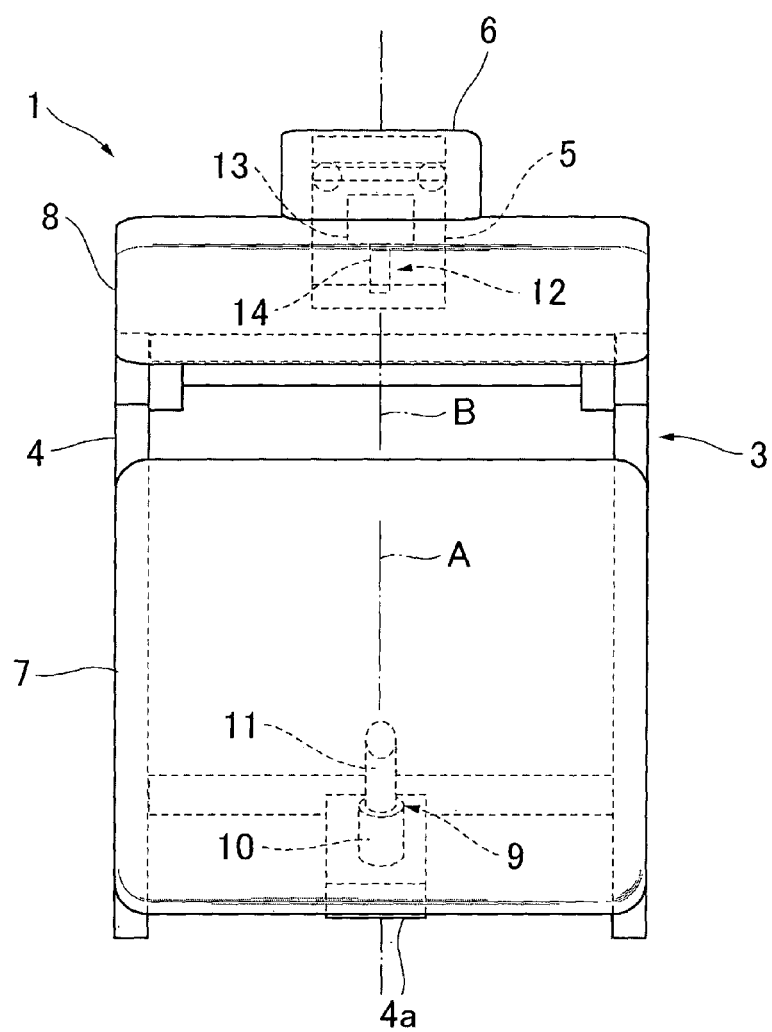
FIG. 5 is a plan view schematically showing the vehicle seat apparatus according to the first example embodiment.
Figure 6:
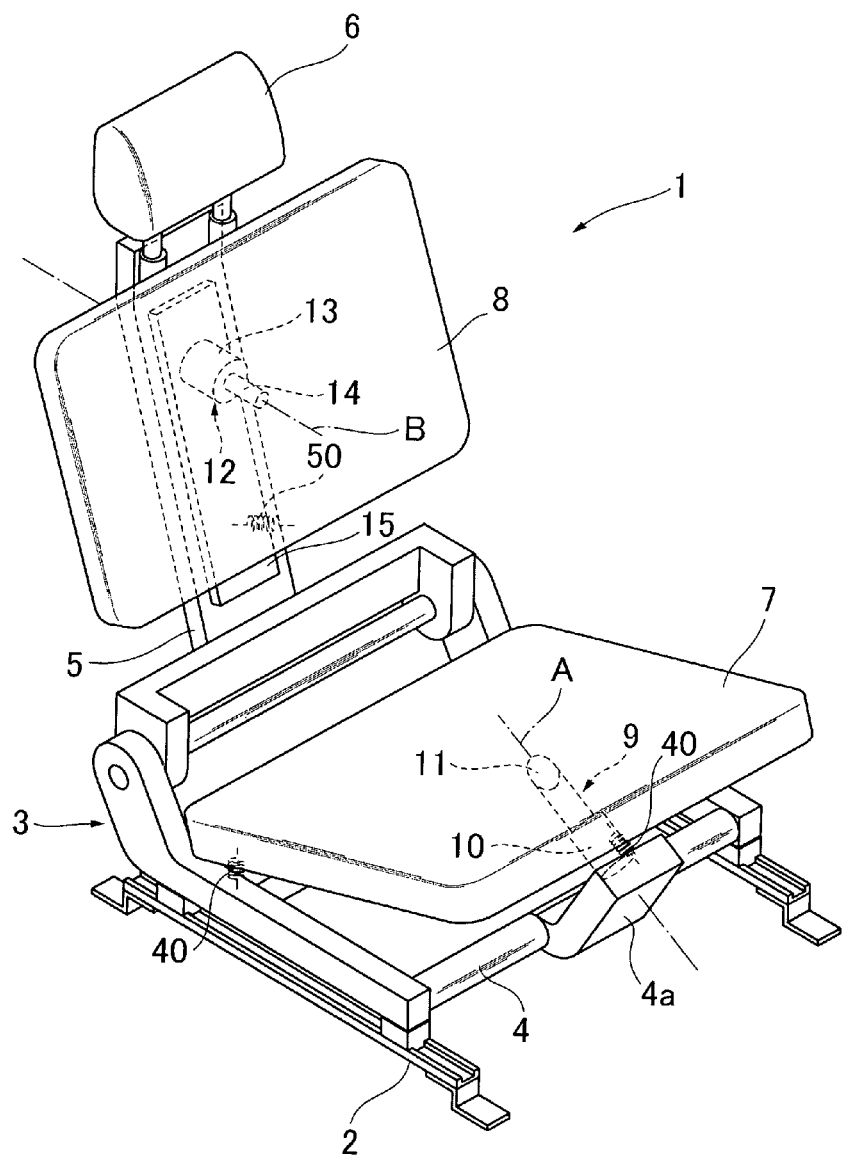
FIG. 6 is a perspective view schematically showing the vehicle seat apparatus according to the first example embodiment.

FIG. 3 is a side view that schematically shows a vehicle seat apparatus according to a first example embodiment of the invention. FIG. 4 is a front view schematically showing the vehicle seat apparatus according to the first example embodiment. FIG. 5 is a plan view schematically showing the vehicle seat apparatus according to the first example embodiment. FIG. 6 is a perspective view schematically showing the vehicle seat apparatus according to the first example embodiment. In the drawings, members such as cushioning material and the like are omitted to facilitate understanding of the structure of the vehicle seat apparatus.

As shown in FIGS. 3 to 6, with the vehicle seat apparatus 1 according to this example embodiment, a seat frame 3 is mounted to a rail 2 that is fixed to a floor F of the vehicle, so as to be able to slide in the longitudinal direction of the vehicle.

The seat frame 3 includes a first seat frame portion 4 that is slidably mounted to the rail 2 and is arranged substantially parallel to the floor F of the vehicle, and a second seat frame portion 5 that stands upright from the first seat frame portion 4 and to which a headrest 6 is mounted. The second seat frame portion 5 is tiltably mounted to the first seat frame portion 4 by a reclining mechanism.

A seat portion supporting mechanism 9 that rotatably supports a seat portion 7 is mounted to the first seat frame portion 4, and a seatback supporting mechanism 12 that rotatably supports a seatback 8 is mounted to the second seat frame portion 5.

The seat portion 7 is a portion upon which mainly the pelvis and the femurs of the driver are placed. In the drawing, the seat portion 7 is drawn as a flat plate shape, but the shape of the seat portion 7 is not particularly limited. Any of various designs may be employed from ergonomic and industrial viewpoints.

The seat portion supporting mechanism 9 is mounted to a seat portion supporting mechanism mounting portion 4a that extends forward and upward of the vehicle seat apparatus 1 from a tip end of the first seat frame portion 4. In order to rotatably support the seat portion 7, this seat portion supporting mechanism 9 includes a thrust bearing 10 that is fixed to the first seat frame portion 4, and a thrust shaft 11 that is fixed to the seat portion 7 and rotatably connected to the thrust bearing 10. A rotational axis A of the seat portion 7 according to the seat portion supporting mechanism 9 is aligned with a rotational axis of the thrust shaft 11. The seat portion 7 and the thrust shaft 11 of the seat portion supporting mechanism 9 are rotating portions (moving portions), and the first seat frame portion 4 and the thrust bearing 10 of the seat portion supporting mechanism 9 are non-rotating portions (non-moving portions). Here, the rotating portions refer to the seat portion 7 and portions that rotate (move) together with the seat portion 7, and the non-rotating portions refer to portions that do not rotate (move) together with the seat portion 7.

The rotational axis A is set such so as to be higher at the rear than at the front in the longitudinal direction of the vehicle seat apparatus 1, and so as to pass through an area near the lumbar region of the driver seated in the vehicle seat apparatus 1. Therefore, the seat portion 7 and the pelvis of the driver that is on the seat portion 7 are able to rotate in the roll direction and the yaw direction of the vehicle about the rotational axis A. The lumbar region refers to a portion of the body that includes the lumbar spine and trunk muscles around the lumbar spine and the like, and the area near the lumbar, region refers to the lumbar region and a portion around the lumbar region.

The rotational axis A of the seat portion 7 may be set by setting the angle of inclination of the seat portion supporting mechanism mounting portion 4a to which the seat portion supporting mechanism 9 is mounted, for example. Also, the rotational axis A may pass through the vertebrae (the lumbar spine) of the driver by mounting the seat portion supporting mechanism 9 in the center portion, in the lateral direction, of the seat portion supporting mechanism mounting portion 4a.

A seat portion restoring force generating mechanism 40 that generates restoring force for returning the seat portion 7 to its original position when the seat portion 7 is rotated, is mounted to the seat portion 7. The specific structure of the seat portion restoring force generating mechanism 40 is not particularly limited. For example, the seat portion restoring force generating mechanism 40 may be formed by an elastic member that is connected to the seat portion 7 or the thrust shaft 11 that are rotating portions, and the first seat frame portion 4 or the thrust bearing 10 that are non-rotating portions. Also, this elastic member may be a spring, for example, and this spring may be a coil spring, a bar spring, a plate spring, a torsion bar, or a flat spiral spring, for example.

Figure 7:
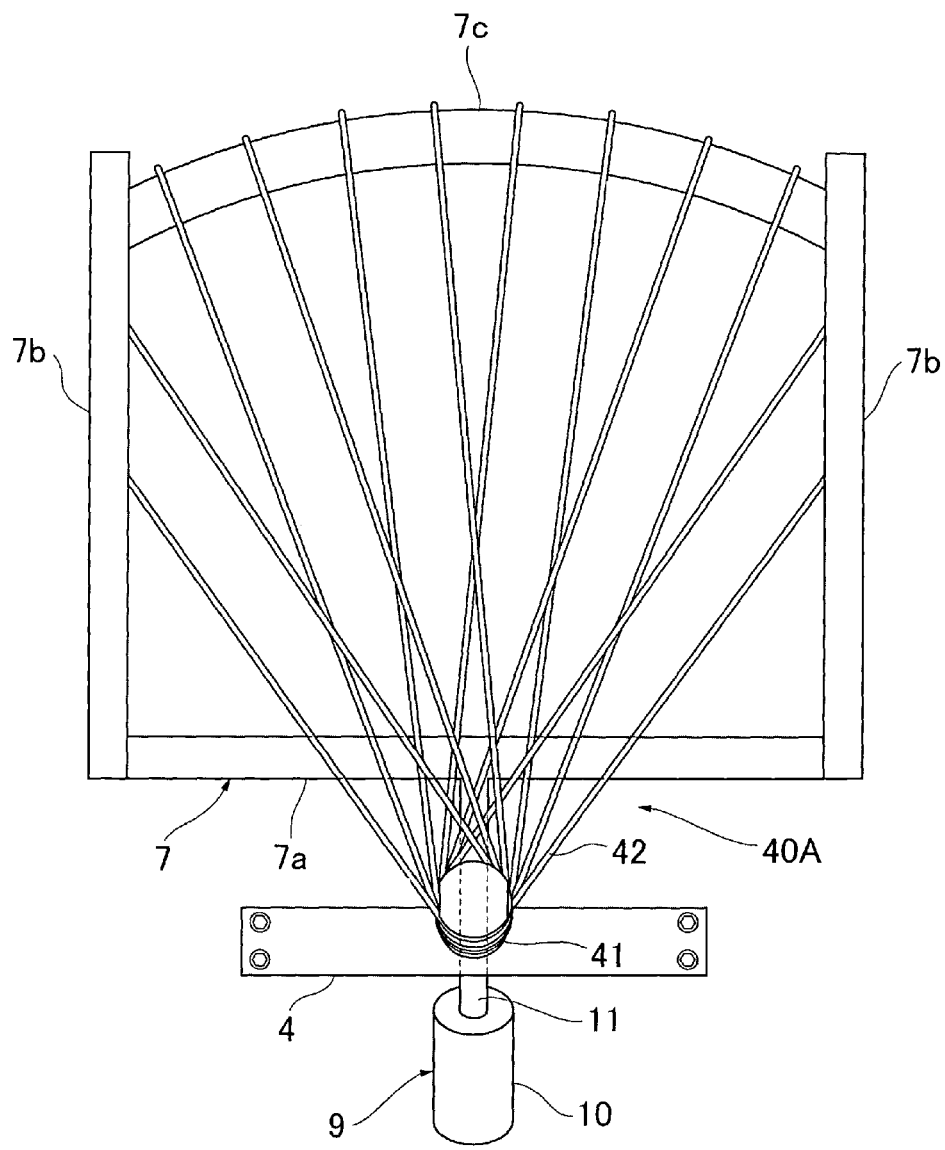
FIG. 7 is a view showing a frame format of a configuration example of a seat portion restoring force generating mechanism.

Here, a specific configuration example of the seat portion restoring force generating mechanism 40 and a seatback restoring force generating mechanism 50 will be described with reference to FIGS. 7 and 15. FIGS. 7 to 10 are views showing frame formats of configuration examples of the seat portion restoring force generating mechanisms.

A seat portion restoring force generating mechanism 40A shown in FIG. 7 is a mechanism in which bar springs that are elastic members are connected to the seat portion 7 that is a rotating portion, and the first seat frame portion 4 that is a non-rotating portion.

More specifically, the seat portion 7 shown in FIG. 7 includes a front frame portion 7a that is connected to the thrust shaft 11 of the seat portion supporting mechanism 9 and extends in a vehicle width direction, a pair of side frame portions 7b that extend in the vehicle longitudinal direction from both ends of the front frame portion 7a, and a rear frame portion 7c that is connected to the rear end of each of the pair of side frame portions 7b. The rear frame portion 7c is curved in a concentric fashion with respect to the rotational center of the seat portion 7.

The seat portion restoring force generating mechanism 40A includes a connecting member 41 that is fixed to the first seat frame portion 4, and a plurality of bar springs 42 that are made of elastic steel wire or the like. The connecting member 41 is arranged at or near the rotational center of the seat portion 7. The bar springs 42 are connected at one end portion to the connecting member 41, and are connected at the other end portion to the pair of side frame portions 7b and the rear frame portion 7c. The sectional shape of the bar springs 42 is not particularly limited. For example, the bar springs 42 may have an angular cross-section, a round cross-section, an elliptical cross-section, or an oval cross-section.

Figure 12:
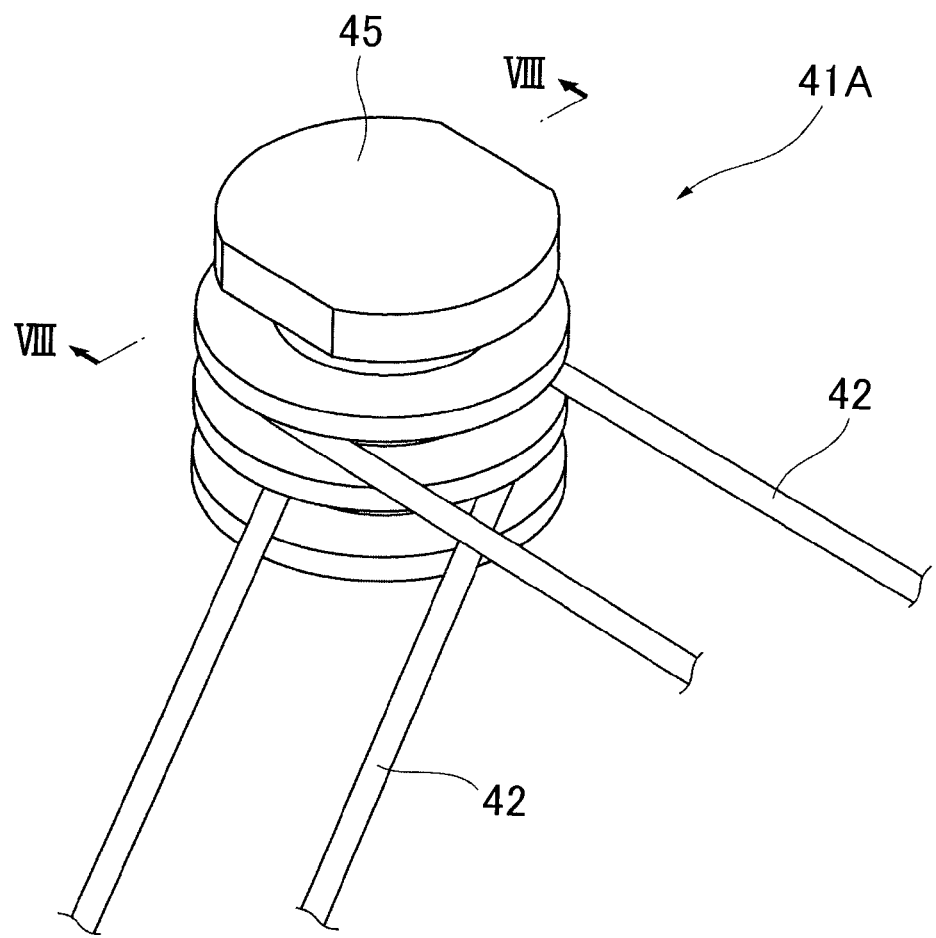
FIG. 12 is a view showing a frame format of a connecting structure of a bar spring with respect to a connecting member.
Figure 14:
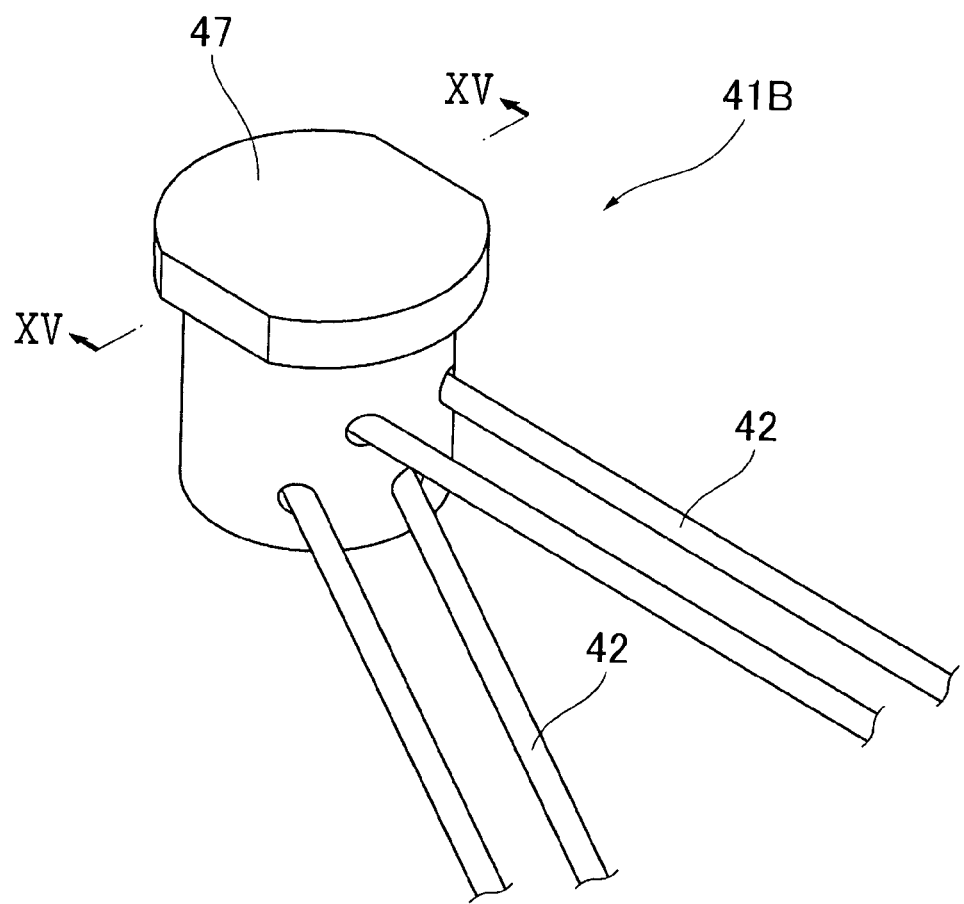
FIG. 14 is a view showing a frame format of another connecting structure of a bar spring with respect to a connecting member.
Figure 16:
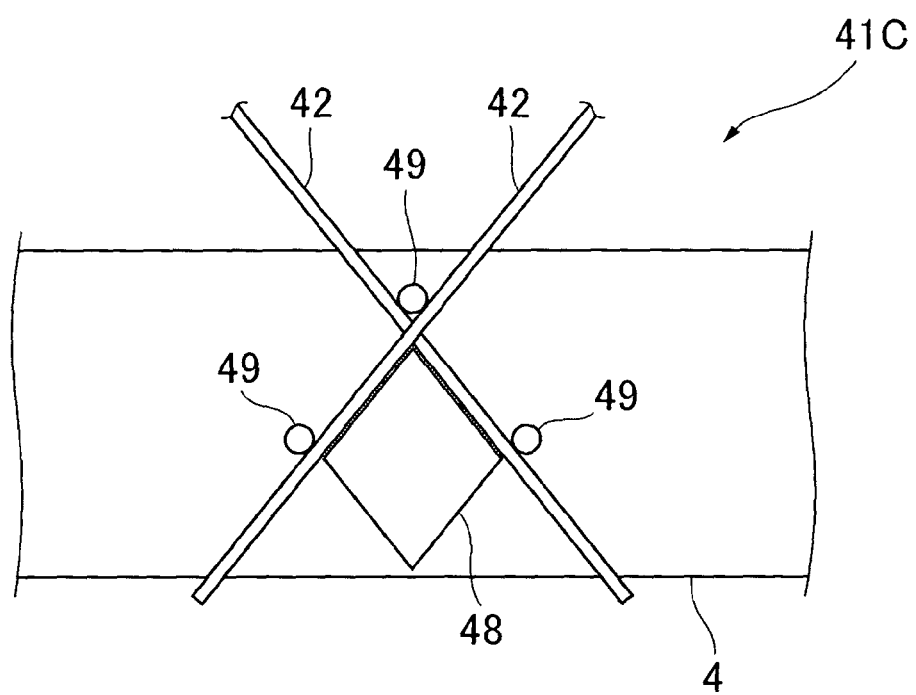
FIG. 16 is a view of a frame format of yet another connecting structure of a bar spring with respect to a connecting member.

Each of the bar springs 42 may be connected to the connecting member 41 by the means shown in FIGS. 12 to 16, for example. FIG. 12 is a view showing a frame format of a connecting structure of the bar springs with respect to a connecting member. FIG. 13 is a sectional view taken along line XIII-XIII shown in FIG. 12. FIG. 14 is a view showing a frame format of another connecting structure of the bar springs with respect to a connecting member. FIG. 15 is a sectional view taken along line XV-XV shown in FIG. 14. FIG. 16 is a view of a frame format of yet another connecting structure of the bar springs with respect to a connecting member.

The connecting member 41A shown in FIGS. 12 and 13 includes a bolt 45 that screws to the first seat frame portion 4, and a plurality of washers 46 through which the bolt 45 is inserted. Also, the bar springs 42 are fixed to the connecting member 41A by tightening the bolt 45 to the first seat frame portion 4 with the bar springs 42 sandwiched between the washers 46. When using the connecting member 41A, a center portion of each of the bar springs 42 may be bent in a U-shape, and this U-shaped bent portion may be fixed to the connecting member 41A.

A connecting member 41B shown in FIGS. 14 and 15 includes a boss 47 that is fixed to the first seat frame portion 4 and in which are formed through-holes into which the bar springs 42 are inserted. Also, the bar springs 42 are connected to the connecting member 41B by the bar springs 42 being inserted into the through-holes of the boss 47. In this case, the bar springs 42 are able to slide with respect to the boss 47, and thus are able to smoothly rotate the seat portion 7.

A connecting member 41C shown in FIG. 16 includes a rhombic or rectangular bending direction restricting frame 48 that is fixed to the first seat frame portion 4 and protrudes from the first seat frame portion 4, and a plurality of bending direction restricting pins 49 that are fixed to the first seat frame portion 4 and protrude from the first seat frame portion 4. Also, the bending direction restricting pins 49 are arranged near the top of the bending direction restricting frame 48. Also, the bar springs 42 are arranged between the bending direction restricting frame 48 and the bending direction restricting pins 49, along the sides of the bending direction restricting frame 48, and the bar springs 42 are hooked on the bending direction restricting frame 48 and the bending direction restricting pins 49. In this case, a bar spring retaining member such as a lid, not shown, that prevents the bar springs 42 from slipping off, is attached to the first seat frame portion 4.

The bar springs 42 may be connected to the side frame portions 7b and the rear frame portion 7c by various means. For example, the other end portion of each of the bar springs 42 may be bent back in a U-shape, and this U-shaped bent back portion may be hooked on the side frame portions 7b and the rear frame portion 7c. Also, a non-slip mechanism, not shown, of the bar springs 42 is attached to the side frame portions 7b and the rear frame portion 7c, so that the positions where the bar springs 42 are hooked onto the side frame portions 7b and the rear frame portion 7c will not move.

By structuring the seat portion restoring force generating mechanism 40A in this way, the bar springs 42 are arranged in a radial fashion with respect to the rotational center of the seat portion 7, so when the seat portion 7 rotates from the normal position, restoring force that returns the seat portion 7 to its original position is generated by the bending rigidity of the bar springs 42 in the rotational direction of the seat portion 7. Therefore, the rotated seat portion 7 will naturally return to its original rotational position.

Also, by connecting the bar springs 42 to the rear frame portion 7c that is curved in a concentric fashion with respect to the rotational center of the seat portion 7, the bar springs 42 are able to be made the same length, so the manufacturing cost of the bar springs 42 is able to be reduced.

Further, by connecting the plurality of bar springs 42 to the connecting member 41 and the frames of the seat portion 7, these bar springs 42 are also able to be used as a cushion of the seat portion 7, so the weight is able to be reduced.

Figure 8:
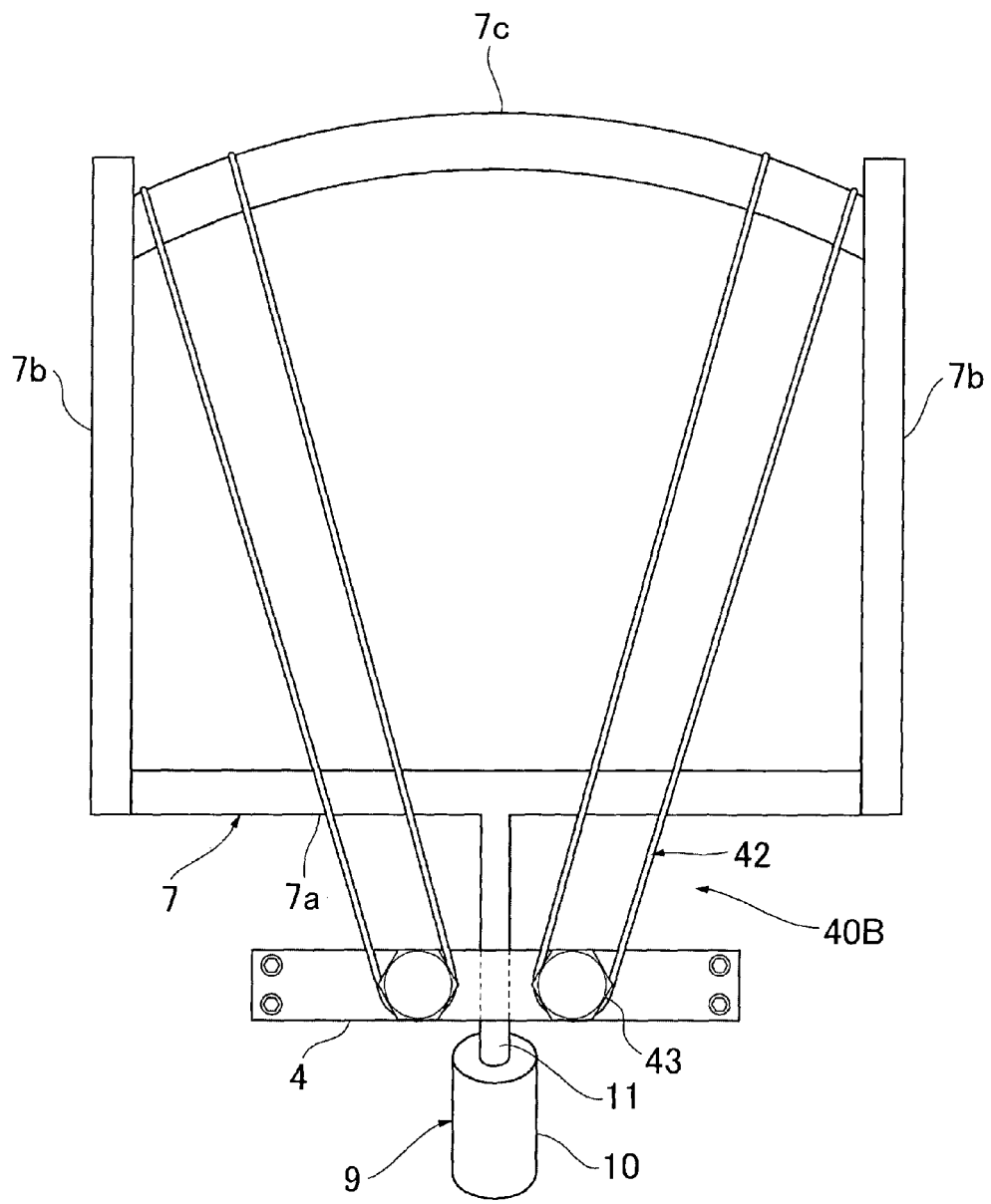
FIG. 8 is a view showing a frame format of another configuration example of a seat portion restoring force generating mechanism.

A seat portion restoring force generating mechanism 40B shown in FIG. 8 is a mechanism in which bar springs that are elastic members are connected to the seat portion 7 that is a rotating portion and the first seat frame portion 4 that is a non-rotating portion.

More specifically, the seat portion 7 shown in FIG. 8 includes a front frame portion 7a that is connected to the thrust shaft 11 of the seat portion supporting mechanism 9 and extends in a vehicle width direction, a pair of side frame portions 7b that extend in the vehicle longitudinal direction from both ends of the front frame portion 7a, and a rear frame portion 7c that is connected to the rear end of each of the pair of side frame portions 7b. The rear frame portion 7c is curved in a concentric fashion with respect to the rotational center of the seat portion 7.

The seat portion restoring force generating mechanism 40B includes a pair of connecting members 43 that are fixed to the first seat frame portion 4, and a pair of bar springs 42 that are made of elastic steel wire or the like. The pair of connecting members 43 are arranged in positions sandwiching the rotational center of the seat portion 7 and offset from this rotational center. The bar springs 42 are connected at one end portion to the connecting members 43, and are connected at the other end portion to the rear frame portion 7c. The connection between the bar springs 42 and the pair of connecting members 43, and the connection between the bar springs 42 and the rear frame portion 7c, are the same as they are in the seat portion restoring force generating mechanism 40A shown in FIG. 7, so a description will be omitted.

By structuring the seat portion restoring force generating mechanism 40B in this way, when the seat portion 7 is rotated from the normal position, restoring force that returns the seat portion 7 to its original position is generated by the bending rigidity of the bar springs 42 in the rotational direction of the seat portion 7. Therefore, the rotated seat portion 7 will naturally return to its original rotational position. Moreover, the bar springs 42 are not arranged in a radial fashion with respect to the rotational center of the seat portion 7, so when the seat portion 7 rotates from the normal position, force other than in a perpendicular direction (i.e., force in a compressing direction or an extending direction) will act on the bar springs 42. Therefore, the restoring force generated in the bar springs 42 becomes larger than the restoring force generated in the seat portion restoring force generating mechanism 40A shown in FIG. 7.

Also, by connecting the bar springs 42 to the rear frame portion 7c that is curved in a concentric fashion with respect to the rotational center of the seat portion 7, the bar springs 42 are able to be made the same length, so the manufacturing cost of the bar springs 42 is able to be reduced.

Further, by connecting the pair of bar springs 42 to the connecting member 41 and the frames of the seat portion 7, this pair of bar springs 42 is also able to be used as a cushion of the seat portion 7, so the weight is able to be reduced.

Figure 9:
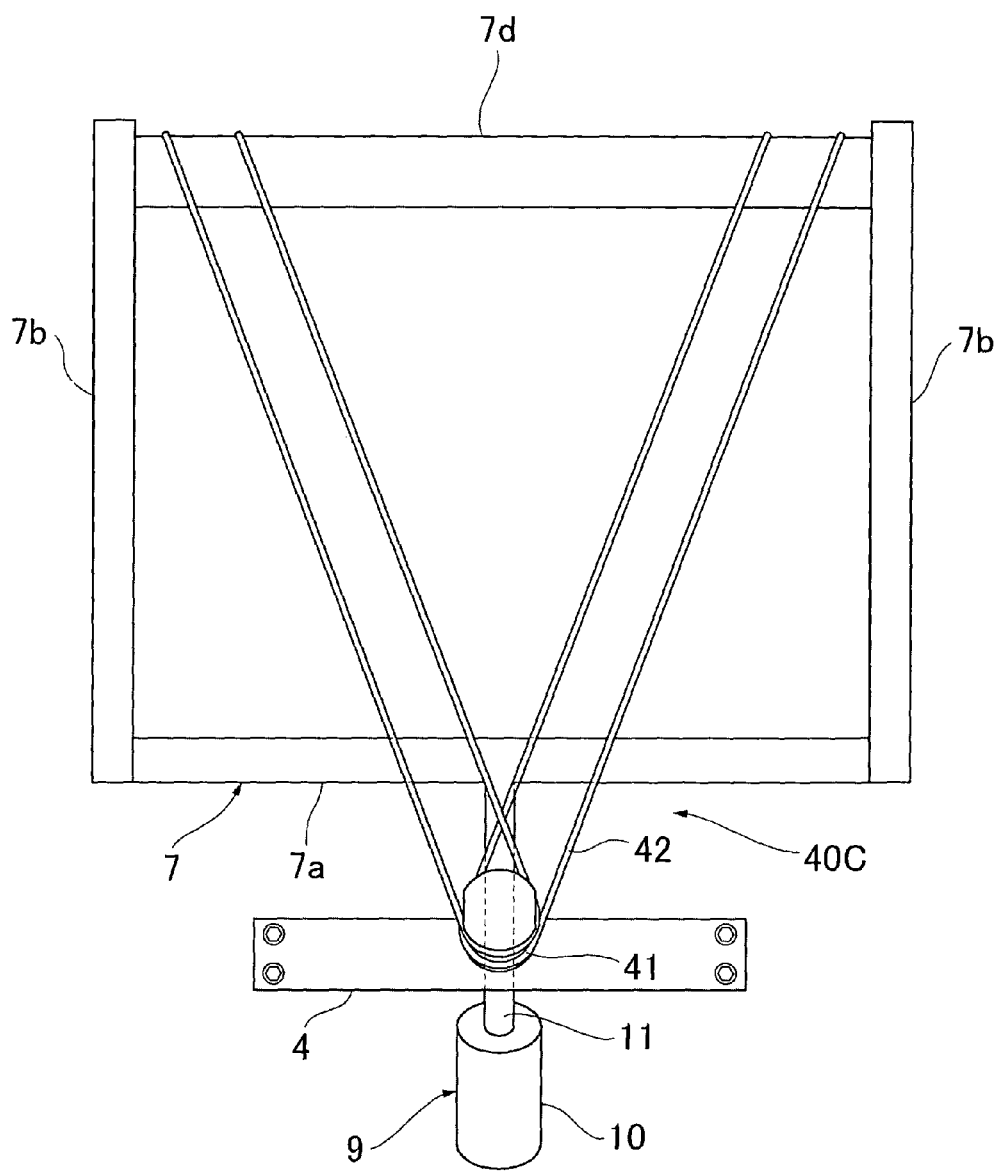
FIG. 9 is a view showing a frame format of yet another configuration example of a seat portion restoring force generating mechanism.

A seat portion restoring force generating mechanism 40C shown in FIG. 9 is a mechanism in which bar springs that are elastic members are connected to the seat portion 7 that is a rotating portion and the first seat frame portion 4 that is a non-rotating portion.

More specifically, the seat portion 7 shown in FIG. 9 includes a front frame portion 7a that is connected to the thrust shaft 11 of the seat portion supporting mechanism 9 and extends in a vehicle width direction, a pair of side frame portions 7b that extend in the vehicle longitudinal direction from both ends of the front frame portion 7a, and a rear frame portion 7d that is connected to the rear end of each of the pair of, side frame portions 7b and that extends in the vehicle width direction.

The seat portion restoring force generating mechanism 40C includes a pair of connecting members 43 that are fixed to the first seat frame portion 4, and a pair of bar springs 42 that are made of elastic steel wire or the like. The pair of connecting members 43 are arranged in positions sandwiching the rotational center of the seat portion 7 and offset from this rotational center. The bar springs 42 are connected at one end portion to the connecting members 43, and are connected at the other end portion to the rear frame portion 7d. The connection between the bar springs 42 and the connecting member 41, and the connection between the bar springs 42 and the rear frame portion 7d, are the same as they are in the seat portion restoring force generating mechanism 40A shown in FIG. 7, so a description will be omitted.

By structuring the seat portion restoring force generating mechanism 40C in this way, when the seat portion 7 is rotated from the normal position, restoring force that returns the seat portion 7 to its original position is generated by the bending rigidity of the bar springs 42 in the rotational direction of the seat portion 7. Therefore, the rotated seat portion 7 will naturally return to its original rotational position. Moreover, the bar springs 42 are not arranged in a radial fashion with respect to the rotational center of the seat portion 7, so when the seat portion 7 rotates from the normal position, force other than in a perpendicular direction (i.e., force in a compressing direction or an extending direction) will act on the bar springs 42. Therefore, the restoring force generated in the bar springs 42 becomes larger than the restoring force generated in the seat portion restoring force generating mechanism 40A shown in FIG. 7.

Also, by connecting the pair of bar springs 42 to the connecting member 41 and the frames of the seat portion 7, this pair of bar springs 42 is also able to be used as a cushion of the seat portion 7, so the weight is able to be reduced.

Figure 10:
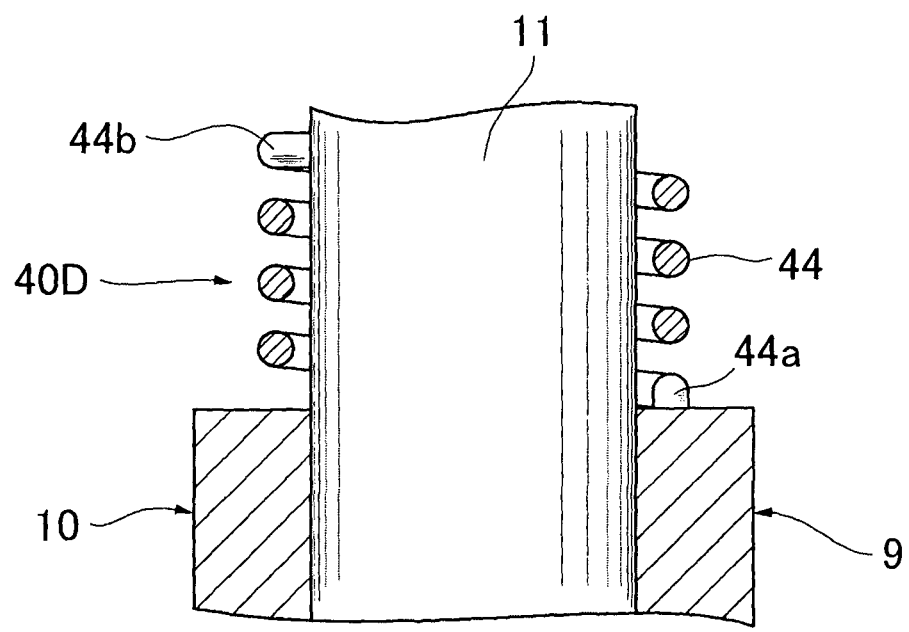
FIG. 10 is a view showing a frame format of still another configuration example of a seat portion restoring force generating mechanism.

A seat portion restoring force generating mechanism 40D shown in FIG. 10 is a mechanism in which a bar spring that is an elastic member is connected to a thrust shaft 11 that is a rotating portion and a thrust bearing 10 that is a non-rotating portion.

More specifically, the seat portion restoring force generating mechanism 40D shown in FIG. 10 includes a coil spring 44 that is connected to the thrust bearing 10 and the thrust shaft 11.

The coil spring 44 is fit over the thrust shaft 11. One end portion 44a of the coil spring 44 is fixed to the thrust bearing 10, and the other end portion 44b is fixed to the thrust shaft 11.

Figure 11:
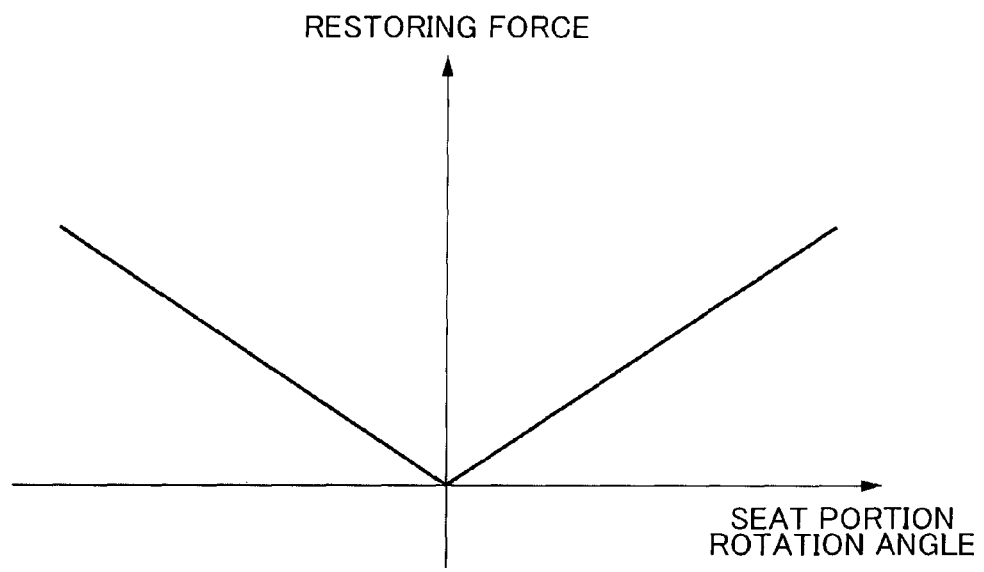
FIG. 11 is a view showing the relationship between a restoring force of a coil spring shown in FIG. 10 and a rotational angle of a seat portion.

By structuring the seat portion restoring force generating mechanism 40D in this way, when the seat portion 7 is rotated from the normal position, restoring force that returns the seat portion 7 to its original position is generated by the coil spring 44 deforming in the radial direction like a flat spiral spring. Therefore, the rotated seat portion 7 will naturally return to its original rotational position. At this time, as shown in FIG. 11, the restoring force generated in the coil spring 44 increases according to the rotational angle of the seat portion 7, so the restoring force that is generated will be the same regardless of the direction in which the seat portion 7 is rotated.

Figure 17:
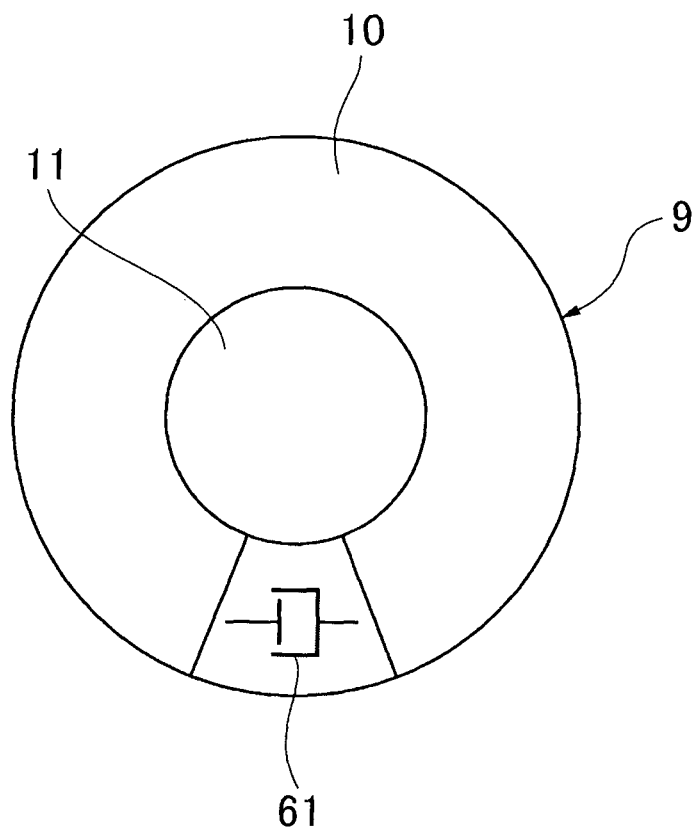
FIG. 17 is a view of a frame format of the structure of a rotary damper.

Also, a damping mechanism 60 for suppressing movement of the rotating portion in the rotational direction may be mounted between the rotating portion and the non-rotating portion. Any of a variety of well-known damping mechanisms (dampers) may be used as the damping mechanism 60. For example, a rotary damper shown in FIG. 17 may also be used. The rotary damper 61 shown in FIG. 17 suppresses rotational movement of the thrust shaft 11 with respect to the thrust bearing 10 by the viscous resistance of oil. The position, number, and hardness and the like of the damping mechanism may be set as appropriate, and the restoring force of the seat portion restoring force generating mechanism may be adjusted according to the position, number, and hardness and the like of the damping mechanism.

Figure 18:
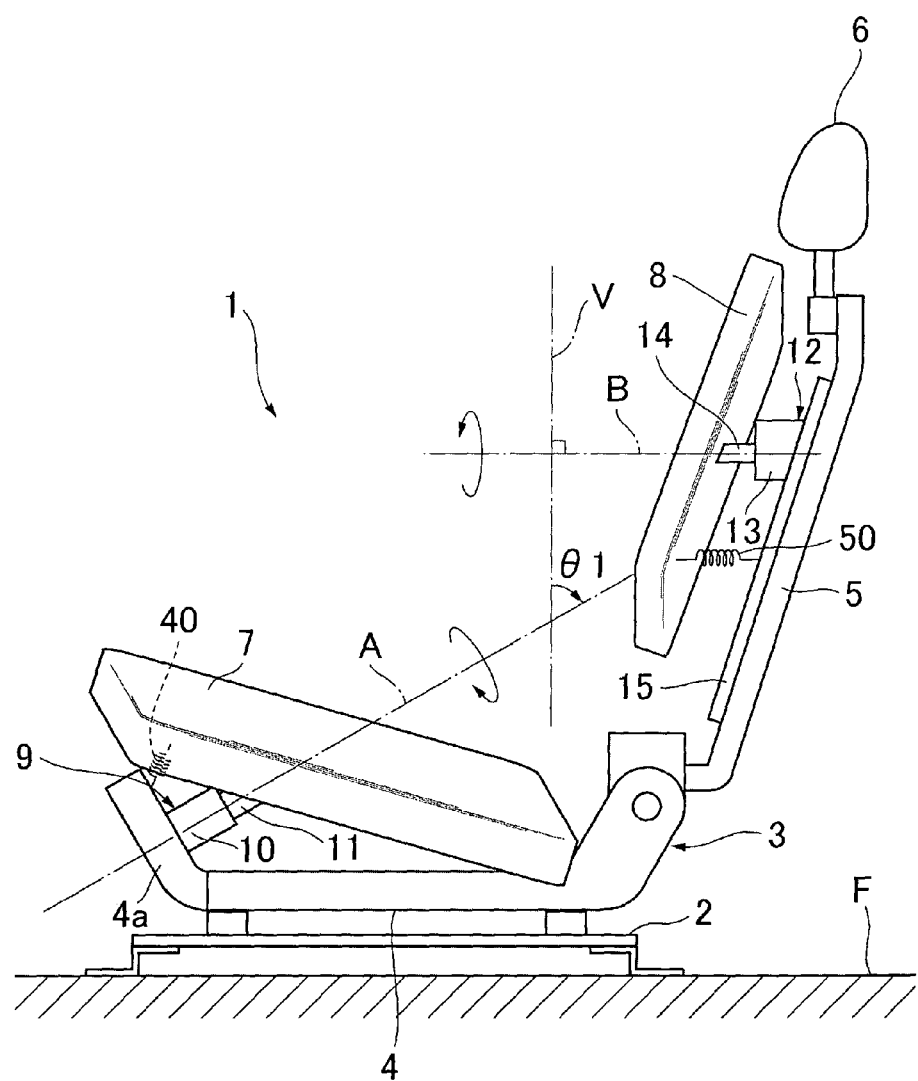
FIG. 18 is a side view schematically showing the vehicle seat apparatus in which a rotating shaft of a seat portion supporting mechanism is rotated to the right when viewed from the front.
Figure 19:
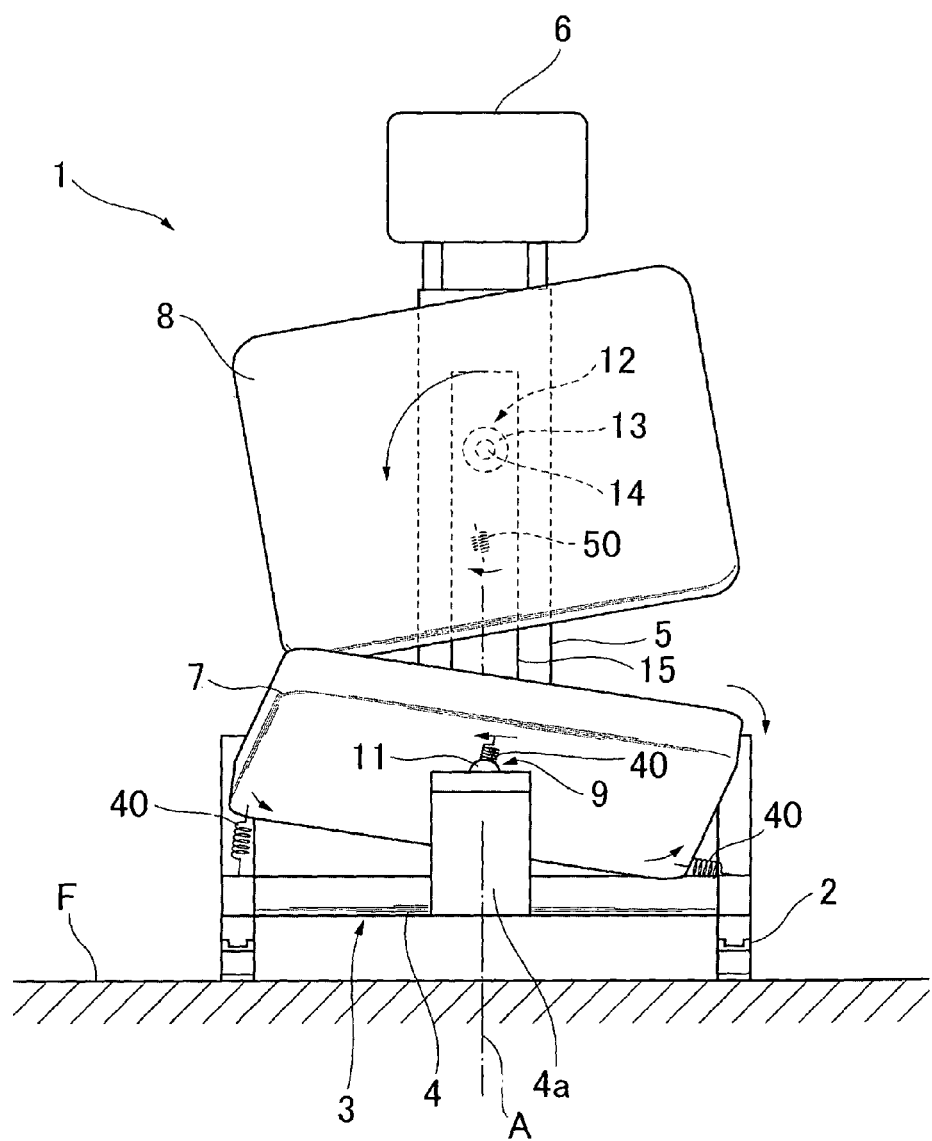
FIG. 19 is a front view schematically showing the vehicle seat apparatus in which the rotating shaft of the seat portion supporting mechanism is rotated to the right when viewed from the front.
Figure 20:
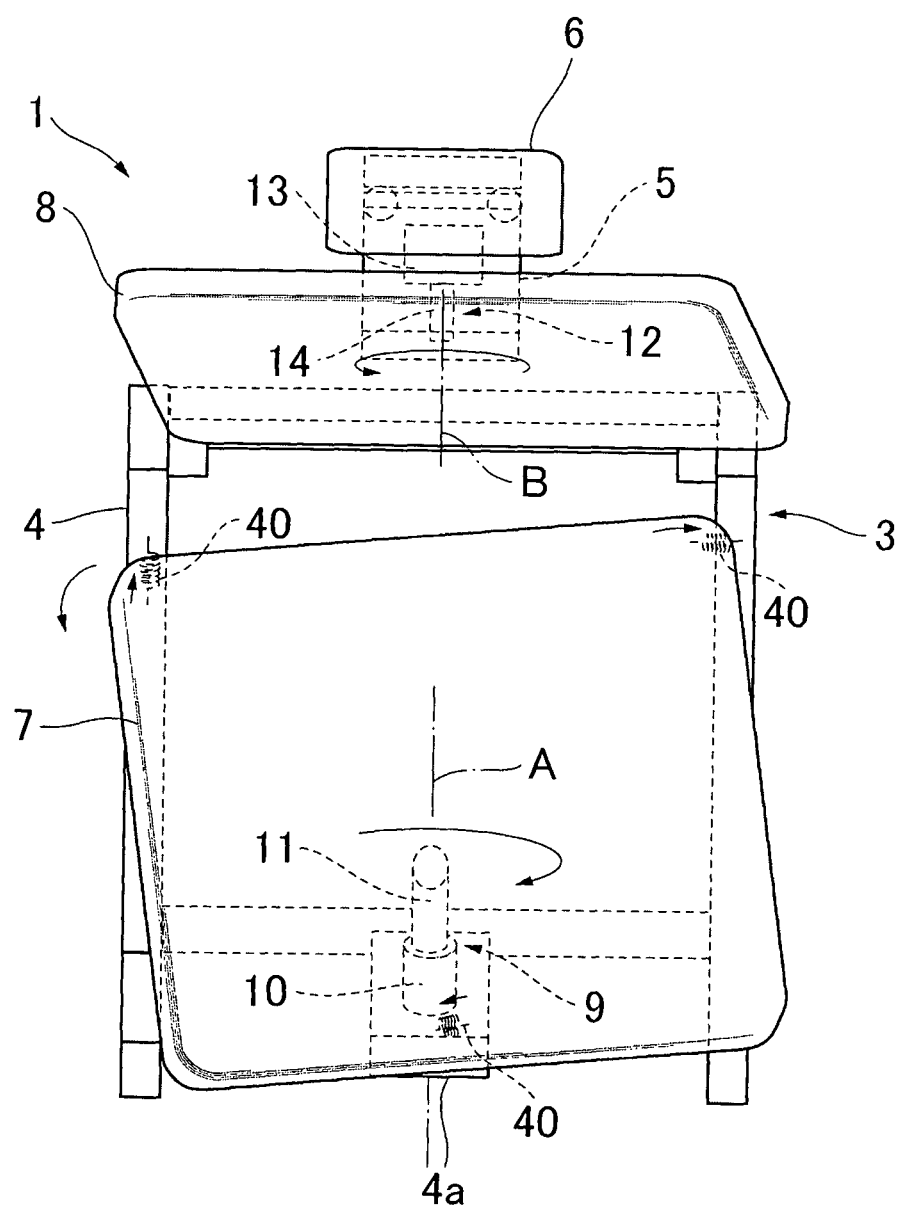
FIG. 20 is a plan view schematically showing the vehicle seat apparatus in which the rotating shaft of the seat portion supporting mechanism is rotated to the right when viewed from the front.
Figure 21:
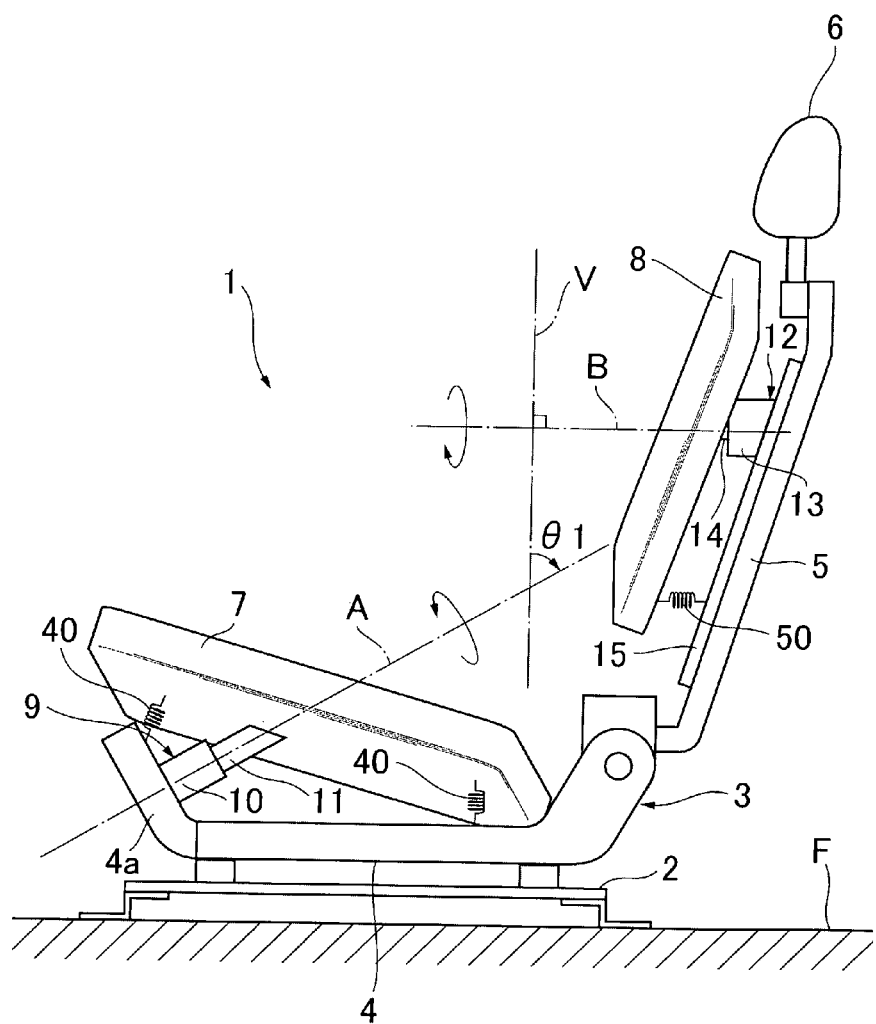
FIG. 21 is a side view schematically showing the vehicle seat apparatus in which the rotating shaft of the seat portion supporting mechanism is rotated to the left when viewed from the front.
Figure 23:
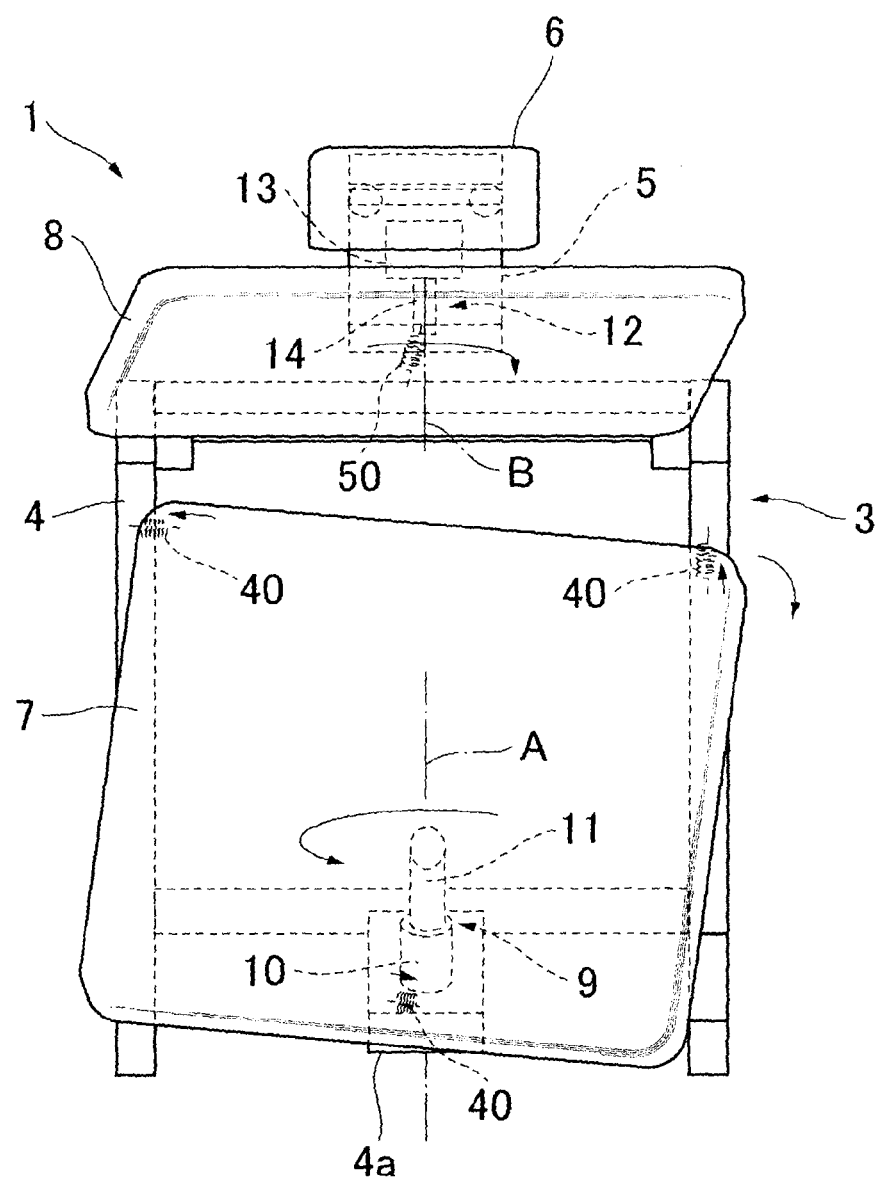
FIG. 23 is a plan view schematically showing the vehicle seat apparatus in which the rotating shaft of the seat portion supporting mechanism is rotated to the left when viewed from the front.

FIG. 18 is a side view schematically showing the vehicle seat apparatus in which a rotating shaft of a seat, portion supporting mechanism is rotated to the right when viewed from the front. FIG. 19 is a front view schematically showing the vehicle seat apparatus in which the rotating shaft of the seat portion supporting mechanism is rotated to the right when viewed from the front. FIG. 20 is a plan view schematically showing the vehicle seat apparatus in which the rotating shaft of the seat portion supporting mechanism is rotated to the right when viewed from the front. FIG. 21 is a side view schematically showing the vehicle seat apparatus in which the rotating shaft of the seat portion supporting mechanism is rotated to the left when viewed from the front. FIG. 22 is a front view schematically showing the vehicle seat apparatus in which the rotating shaft of the seat portion supporting mechanism is rotated to the left when viewed from the front. FIG. 23 is a plan view schematically showing the vehicle seat apparatus in which the rotating shaft of the seat portion supporting mechanism is rotated to the left when viewed from the front.

When the thrust shaft 11 of the seat portion supporting mechanism 9 is rotated to the right (clockwise) about the rotational axis A when the vehicle seat apparatus 1 is viewed from the front, as shown in FIGS. 18 to 20, the seat portion 7 rotates in the roll direction and the yaw direction of the vehicle about the rotational axis A, and assumes a posture such as that described below.

That is, the seat portion 7 comes to be in a posture in which the right side of the seat portion 7 has, moved relatively upward in the vertical direction of the vehicle seat apparatus 1 with respect to the left side of the seat portion 7, by the seat portion 7 rotating in the roll direction of the vehicle about the rotational axis A. As a result, the pelvis of the driver seated on the seat portion 7 will rotate in the roll direction of the vehicle about the rotational axis A, such that the driver will come to be in a posture in which the right side of the pelvis has moved relatively upward in the vertical direction of the driver with respect to the left side of the pelvis. In this example embodiment, the rotation of the seat portion 7 and the pelvis in the roll direction of the vehicle about the rotational axis A in this way will be referred to as clockwise rotation in the roll direction. This clockwise rotation refers to a rotational direction of the seat portion 7 when the vehicle seat apparatus 1 is viewed from the front, as shown in FIG. 19.

Also, the seat portion 7 comes to be in a posture in which the right side of the seat portion 7 has moved relatively forward in the longitudinal direction of the vehicle seat apparatus 1 with respect to the left side of the seat portion 7, by the seat portion 7 rotating in the yaw direction of the vehicle about the rotational axis A. As a result, the pelvis of the driver seated on the seat portion 7 will rotate in the yaw direction of the vehicle about the rotational axis A, such that the driver will come to be in a posture in which the right side of the pelvis has moved relatively forward in the longitudinal direction of the driver with respect to the left side of the pelvis. In this example embodiment, the rotation of the seat portion 7 and the pelvis in the yaw direction of the vehicle about the rotational axis A in this way will be referred to as counterclockwise rotation in the yaw direction. This counterclockwise rotation refers to a rotational direction of the seat portion 7 when the vehicle seat apparatus 1 is viewed the above, as shown in FIG. 20.

In this way, when the seat portion 7 rotates in the roll direction and the yaw direction of the vehicle about the rotational axis A, restoring force that returns the seat portion 7 to its original position is generated in the seat portion restoring force generating mechanism 40. More specifically, the seat portion restoring force generating mechanism 40 generates restoring force that tries to rotate the seat portion 7 in a direction opposite the rotational direction of the seat portion 7, i.e., restoring force that tries to rotate the seat portion 7 counterclockwise in the roll direction and clockwise in the yaw direction. Therefore, after a steering operation is performed and the vehicle has been turned, the thrust shaft 11 rotates to the left (counterclockwise) about the rotational axis A, and the seat portion 7 rotates counterclockwise in the roll direction and clockwise in the yaw direction, such that the rotated seat portion 7 is returned to its original position, by the restoring force generated by the seat portion restoring force generating mechanism 40.

On the other hand, as shown in FIGS. 21 to 23, when the thrust shaft 11 of the seat portion supporting mechanism 9 rotates to the left (counterclockwise) about the rotational axis A when the vehicle seat apparatus 1 is viewed from the front, the seat portion 7 rotates in the roll direction and the yaw direction of the vehicle about the rotational axis A, and assumes a posture such as that described below.

That is, the seat portion 7 comes to be in a posture in which the left side of the seat portion 7 has moved relatively upward in the vertical direction of the vehicle seat apparatus 1 with respect to the right side of the seat portion 7, by the seat portion 7 rotating in the roll direction of the vehicle about the rotational axis A. As a result, the pelvis of the driver seated on the seat portion 7 will rotate in the roll direction of the vehicle about the rotational axis A, such that the driver will come to be in a posture in which the left side of the pelvis has moved relatively upward in the vertical direction of the driver with respect to the right side of the pelvis. In this example embodiment, the rotation of the seat portion 7 and the pelvis in the roll direction of the vehicle about the rotational axis A in this way will be referred to as counterclockwise rotation in the roll direction. This counterclockwise rotation refers to a rotational direction of the seat portion 7 when the vehicle seat apparatus 1 is viewed from the front, as shown in FIG. 22.

Also, the seat portion 7 comes to be in a posture in which the left side of the seat portion 7 has moved relatively forward in the longitudinal direction of the vehicle seat apparatus 1 with respect to the right side of the seat portion 7, by the seat portion 7 rotating in the yaw direction of the vehicle about the rotational axis A. As a result, the pelvis of the driver seated on the seat portion 7 will rotate in the yaw direction of the vehicle about the rotational axis A, such that the driver will come to be in a posture in which the left side of the pelvis has moved relatively forward in the longitudinal direction of the driver with respect to the right side of the pelvis. In this example embodiment, the rotation of the seat portion 7 and the pelvis in the yaw direction of the vehicle about the rotational axis A in this way will be referred to as clockwise rotation in the yaw direction. This clockwise rotation refers to a rotational direction of the seat portion 7 when the vehicle seat apparatus 1 is viewed the above, as shown in FIG. 23.

In this way, when the seat portion 7 rotates in the roll direction and the yaw direction of the vehicle about the rotational axis A, restoring force that returns the seat portion 7 to its original position is generated in the seat portion restoring force generating mechanism 40. More specifically, the seat portion restoring, force generating mechanism 40 generates restoring force that tries to rotate the seat portion 7 in a direction opposite the rotational direction of the seat portion 7, i.e., restoring force that tries to rotate the seat portion 7 clockwise in the roll direction and counterclockwise in the yaw direction. Therefore, after a steering operation is performed and the vehicle has been turned, the thrust shaft 11 rotates to the right (clockwise) about the rotational axis A, and the seat portion 7 rotates clockwise in the roll direction and counterclockwise in the yaw direction, such that the rotated seat portion 7 is returned to its original position, by the restoring force generated by the seat portion restoring force generating mechanism 40.

Figure 24:
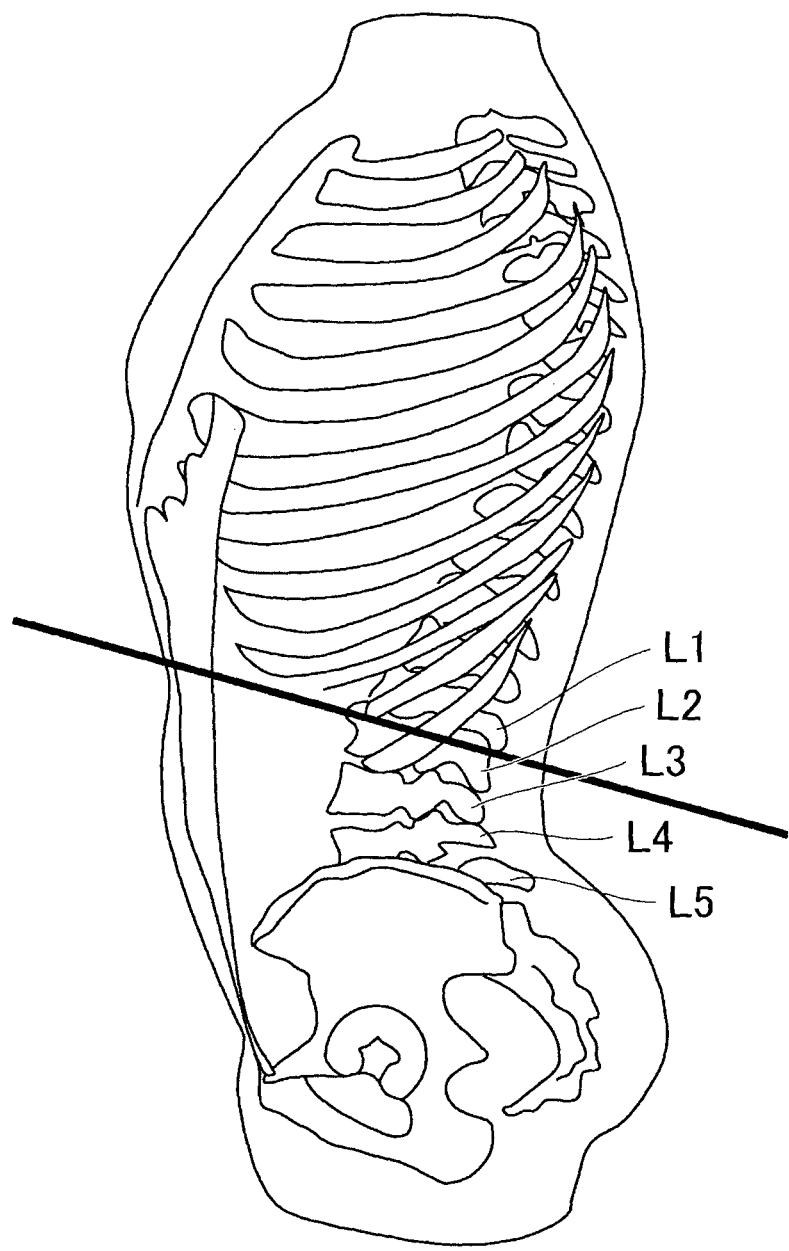
FIG. 24 is a side view of a skeleton of the upper body of a person.

Here, the set angle of the rotational axis A of the seat portion 7 will be described with reference to FIG. 24. FIG. 24 is a side view of a skeleton of the upper body of a person. As shown in FIG. 24, the spine is formed by a plurality of vertebrae that are connected together via intervertebral disks, and is curved in an S-shape when viewed from the side. The lumbar spine that forms a portion of the spine is formed by five vertebrae that are connected above the sacrum (also referred to as "sacral vertebrae") of the pelvis, and extend upward while inclining rearward from the sacrum of the pelvis. These vertebrae that form the lumbar spine are referred to as L1 to L5 from above. Also, the lumbar spine is able to bend and twist by the intervertebral disks that connect the vertebrae that form the lumbar spine together. Therefore, the easiest movement that twists the lumbar spine is movement in which an axis that passes through the intervertebral disks and is orthogonal to the surfaces of the intervertebral disks is the rotational axis.

When the driver is in a posture seated in the vehicle seat apparatus 1, an inclination angle θ1 of the axis that is orthogonal to the surfaces of the intervertebral disks of the lumbar spine with respect to a vertical line V is somewhere around 45°. However, when the inclination angle of the rotational axis A with respect to the vertical line V is small, the legs of the driver are far away from the rotational axis A, so the legs of the driver (especially the knee area) may swing from the rotation of the seat portion 7. Therefore, a steering operation will be easier to perform and posture will be easier to maintain during a turn if the inclination angle of the rotational axis A with respect to the vertical line V is increased, and the swing (rotation) of the seat portion 7 and the pelvis is greater in the roll direction than the yaw direction.

Therefore, the inclination angle θ1 of the rotational axis A with respect to the vertical line V is preferably set within a range of 60°±15° with respect to the vertical line V. That is, this inclination angle θ1 may be set within a range from equal to or greater than 45° to equal to or less than 75°. In this case, this inclination angle θ1 may also be set within a range of equal to or greater than 50° to equal to or less than 70°, or may also be set within a range of equal to or greater than 55° to equal to or less than 65°.

Furthermore, in view of making it easier to twist the lumbar spine, the rotational axis A may be set so as to pass through the vertebra L4 or L5 that form the lumbar spine, for example.

Also, a seat portion restricting mechanism, not shown, that restricts the rotation angle range of the seat portion 7 according to the seat portion supporting mechanism 9 so that the driver will not fall off of the seat portion 7 due to the seat portion 7 rotating, is attached to the vehicle seat apparatus 1. The seat portion restricting mechanism may be attached in any of a variety of places, such as the seat portion supporting mechanism 9, the first seat frame portion 4, or the floor F, for example. The rotation angle restricting range of the seat portion 7 according to the seat portion restricting mechanism may be set to equal to or less than 10° to both the left and right. In this case, for example, the rotation angle restricting range of the seat portion 7 may be able to change in steps such as 2.5°, 5°, 10°, etc. to both the left and right, or the rotation angle restricting range of the seat portion 7 may be able to change linearly.

As shown in FIGS. 3 to 6, the seatback 8 is arranged on the rear side of the seat portion 7, and is designed mainly to be leaned against by the scapula of the driver. In the drawings, the seatback 8 is drawn as a flat plate shape, but the shape of the seatback 8 is not particularly limited. Any of various designs may be employed from ergonomic and industrial viewpoints.

In order to rotatably support the seatback 8, the seatback supporting mechanism 12 includes a thrust bearing 13 that is fixed to the second seat frame portion 5, and a thrust shaft 14 that is fixed to the seatback 8 and rotatably connected to the thrust bearing 13. Also, a rotational axis B of the seatback 8 according to the seatback supporting mechanism 12 is aligned with a rotational axis of the thrust shaft 14. The seatback 8 and the thrust shaft 14 of the seatback supporting mechanism 12 are rotating portions, and the second seat frame portion 5 and the thrust bearing 13 of the seatback supporting mechanism 12 are non-rotating portions. Here, the rotating portions refer to the seatback 8 and portions that rotate (move) together with the seatback 8, and the non-rotating portions refer to portions that do not rotate (move) together with the seatback 8.

The rotational axis B of the seatback 8 is set so as to be parallel (horizontal) to the longitudinal direction of the vehicle seat apparatus 1, and so as to pass through an area near the chest of the driver seated in, the vehicle seat apparatus 1. Therefore, both the seatback 8 and the scapula of the driver that are leaning against the seatback 8 are able to rotate in the roll direction of the vehicle about the rotational axis B. The chest refers to a portion of the body that includes the thoracic vertebrae and the muscles and the like around the thoracic vertebrae, and the area near the chest refers to the chest and an area around the chest.

The height of the rotational axis B of the seatback 8 is able to be adjusted by the mounting position of the seatback supporting mechanism 12 with respect to the second seat frame portion 5. In this case, as shown in the drawings, a slide rail 15 that extends in the vertical direction of the vehicle seat apparatus 1 is mounted to the second seat frame portion 5, and the seatback 8 is able to be mounted to the second seat frame portion 5 via the slide rail 15, so as to be able to slide in the vertical direction of the vehicle seat apparatus 1. Accordingly, the scapula are able to be leaned against the seatback 8, corresponding to differences in the physical build of drivers, so the rotational axis B is able to be easily set such that it passes through an area near the chest of the driver seated in the vehicle seat apparatus 1. Also, the rotational axis B is able to pass through the vertebrae (thoracic vertebrae) of the driver by mounting the seatback supporting mechanism 12 in the center portion, in the lateral direction, of the second seat frame portion 5. When the slide rail 15 is provided, it (i.e., the slide rail 15) may also be a non-rotating portion.

A seatback restoring force generating mechanism 50 that generates restoring force that returns the seatback 8 to its original position when the seatback 8 is rotated, is mounted to the seatback 8. The specific structure of the seatback restoring force generating mechanism 50 is not particularly limited. For example, the seatback restoring force generating mechanism 50 may be an elastic member that is connected to the seatback 8 or the thrust shaft 14 that are rotating portions, and the second seat frame portion 5 or the thrust bearing 13 that are non-rotating portions. Also, this elastic member may be a spring, for example, and this spring may be a coil spring, a bar spring, a plate spring, a torsion bar, or a flat spiral spring, for example.

The specific structure of the seatback restoring force generating mechanism 50 is not particularly limited. For example, it may be the same as the structure of the seat portion restoring force generating mechanism 40. That is, in FIGS. 7 to 17, the first seat frame portion 4 may be the second seat frame portion 5, the seat portion 7 may be the seatback 8, the seat portion supporting mechanism 9 may be the seatback supporting mechanism 22, and the seat portion restoring force generating mechanism 40 may be the seatback restoring force generating mechanism 50.

As shown in FIGS. 18 to 20, when the thrust shaft 14 of the seatback supporting mechanism 12 is rotated to the left about the rotational axis B when the vehicle seat apparatus 1 is viewed from the front, the seatback 8 rotates in the roll direction of the vehicle about the rotational axis B, and assumes a posture such as that described below.

That is, the seatback 8 comes to be in a posture in which the right side of the seatback 8 has moved relatively downward in the vertical direction of the vehicle seat apparatus 1 with respect to the left side of the seatback 8, by the seatback 8 rotating in the roll direction of the vehicle about the rotational axis B. As a result, the scapula of the driver seated against the seatback 8 will rotate in the roll direction of the vehicle about the rotational axis B, such that the driver will come to be in a posture in which the right side of the scapula has moved relatively downward in the vertical direction of the driver with respect to the left side of the scapula. In this example embodiment, the rotation of the seatback 8 and the scapula in the roll direction of the vehicle about the rotational axis B in this way will be referred to as counterclockwise rotation in the roll direction. This counterclockwise rotation refers to a rotational direction of the seatback 8 when the vehicle seat apparatus 1 is viewed from the front, as shown in FIG. 19.

In this way, when the seatback 8 rotates in the roll direction of the vehicle about the rotational axis B, restoring force that returns the seatback 8 to its original position is generated in the seatback restoring force generating mechanism 50. More specifically, the seatback restoring force generating mechanism 50 generates restoring force that tries to rotate the seatback 8 in a direction opposite the rotational direction of the seatback 8, i.e., restoring force that tries to rotate the seatback 8 clockwise in the roll direction. Therefore, after a steering operation is performed and the vehicle has been turned, the thrust shaft 14 rotates to the right about the rotational axis B, and the seatback 8 rotates clockwise in the roll direction, such that the rotated seatback 8 is returned to its original position, by the restoring force generated by the seatback restoring force generating mechanism 50.

On the other hand, as shown in FIGS. 21 to 23, when the thrust shaft 14 of the seatback supporting mechanism 12 is rotated to the right about the rotational axis B when the vehicle seat apparatus 1 is viewed from the front, the seatback 8 rotates in the roll direction of the vehicle about the rotational axis B, and assumes a posture such as that described below.

That is, the seatback 8 comes to be in a posture in which the left side of the seatback 8 has moved relatively downward in the vertical direction of the vehicle seat apparatus 1 with respect to the right side of the seatback 8, by the seatback 8 rotating in the roll direction of the vehicle about the rotational axis B. As a result, the scapula of the driver seated against the seatback 8 will rotate in the roll direction of the vehicle about the rotational axis B, such that the driver will come to be in a posture in which the left side of the scapula has moved relatively downward in the vertical direction of the driver with respect to the right side of the scapula. In this example embodiment, the rotation of the seatback 8 and the scapula in the roll direction of the vehicle about the rotational axis B in this way will be referred to as clockwise rotation in the roll direction. This clockwise rotation refers to a rotational direction of the seatback 8 when the vehicle seat apparatus 1 is viewed from the front, as shown in FIG. 22.

In this way, when the seatback 8 rotates in the roll direction of the vehicle about the rotational axis B, restoring force that returns the seatback 8 to its original position is generated in the seatback restoring force generating mechanism 50. More specifically, the seatback restoring force generating mechanism 50 generates restoring force that tries to rotate the seatback 8 in a direction opposite the rotational direction of the seatback 8, i.e., restoring force that tries to rotate the seatback 8 counterclockwise in the roll direction. Therefore, after a steering operation is performed and the vehicle has been turned, the thrust shaft 14 rotates to the left about the rotational axis B, and the seatback 8 rotates counterclockwise in the roll direction, such that the rotated seatback 8 is returned to its original position, by the restoring force generated by the seatback restoring force generating mechanism 50.

Also, the vehicle seat apparatus 1 may also be provided with a seatback restricting mechanism, not shown, that restricts the rotation angle range of the seatback 8 according to the seatback supporting mechanism 12. The seatback restricting mechanism may be attached in any of a variety of places, such as the seatback supporting mechanism 12, the second seat frame portion 5, or the floor F, for example. The rotation angle restricting range of the seatback 8 according to the seatback restricting mechanism may be set to equal to or less than 10° to both the left and right. In this case, for example, the rotation angle restricting range of the seatback 8 may be able to change in steps such as 2.5°, 5°, 10°, etc. to both the left and right, or the rotation angle restricting range of the seatback 8 may be able to change linearly.

Next, the operation of the vehicle seat apparatus 1 will be described.

As described above, in order to turn the steering wheel, the driver that performs the steering operation moves the shoulder on the inside in the turning direction relatively downward in the vertical direction of the vehicle seat apparatus 1 with respect to the shoulder on the outside in the turning direction, and moves the shoulder on the inside in the turning direction relatively backward in the longitudinal direction of the vehicle seat apparatus 1 with respect to the shoulder on the outside in the turning direction. At this time, from the theorem of conservation of angular momentum of the pelvis and the shoulders, the steering operation is able to be performed more easily by making the distance between the pelvis and the shoulder on the inside in the turning direction of the vehicle shorter than the distance between the pelvis and the shoulder on the outside in the turning direction of the vehicle by bending the lumbar spine, and rotating the pelvis in the direction opposite the shoulders by twisting the lumbar spine. This is because movement of a person is first generated at the lumbar region, and is natural movement that people acquire empirically.

In the vehicle seat apparatus 1 according to this example embodiment, the seat portion 7 and the seatback 8 are rotatably supported, so the driver that performs a steering operation is able to assume this kind of natural and effortless posture consciously or unconsciously.

Moreover, after a steering operation is performed and the vehicle has been turned, the seat portion 7 and the seatback 8 that have been rotated are returned to their original positions by the restoring force generated by the seat portion restoring force generating mechanism 40 and the seatback restoring force generating mechanism 50. Therefore, after a steering operation is performed and the vehicle has been turned, the driver is able to naturally return to a straight posture even if the driver does not consciously straighten his or her posture.

Here, a situation when a steering operation is performed and the vehicle is turned will be described in detail. A driver that is trying to turn the vehicle to the right consciously or unconsciously tries to turn the pelvis and shoulders in opposite directions. That is, the driver tries to rotate the pelvis clockwise in the roll direction, and rotate the shoulders counterclockwise in the roll direction, by bending the lumbar spine using the trunk muscles. Also, the driver tries to rotate the pelvis counterclockwise in the yaw direction by twisting the lumbar region using the trunk muscles. Then, as shown in FIGS. 18 to 20, the seat portion 7 rotates clockwise in the roll direction (see FIG. 19) and rotates counterclockwise in the yaw direction (see FIG. 20), with the movement of the pelvis, and the seatback 8 rotates counterclockwise in the roll direction (see FIG. 19) with the movement of the scapula following the movement of the shoulders. As a result, the posture of the driver becomes the posture shown in FIG. 1, so the driver is able to perform the steering operation of turning the vehicle to the right easily according to the theorem of conservation of angular momentum of the pelvis and the shoulders. The driver that tries to turn the vehicle to the right may move the pelvis and the shoulders in opposite directions right before performing the steering operation to turn the steering wheel, simultaneously with the steering operation, or after the steering operation.

Furthermore, the driver is able to maintain the posture shown in FIG. 1 until the turn of the vehicle to the right is finished.

On the other hand, a driver that is trying to turn the vehicle to the left consciously or unconsciously tries to turn the pelvis and shoulders in opposite directions. That is, the driver tries to rotate the pelvis counterclockwise in the roll direction, and rotate the shoulders clockwise in the roll direction, by bending the lumbar spine using the trunk muscles. Also, the driver tries to rotate the pelvis clockwise in the yaw direction by twisting the lumbar region using the trunk muscles. Then, as shown in FIGS. 21 to 23, the seat portion 7 rotates counterclockwise in the roll direction (see FIG. 22) and rotates clockwise in the yaw direction (see FIG. 23), with the movement of the pelvis, and the seatback 8 rotates clockwise in the roll direction (see FIG. 22) with the movement of the scapula. As a result, the posture of the driver becomes the posture shown in FIG. 2, so the driver is able to perform the steering operation of turning the vehicle to the left easily according to the theorem of conservation of angular, momentum of the pelvis and the shoulders. The driver that tries to turn the vehicle to the left may move the pelvis and the shoulders in opposite, directions right before performing the steering operation to turn the steering wheel, simultaneously with the steering operation, or after the steering operation.

Furthermore, the driver is able to maintain the posture shown in FIG. 2 until the turn of the vehicle to the left is finished.

Here, mechanical considerations when the driver assumes the posture shown in FIG. 2 when turning the vehicle will be described with reference to FIGS. 25A, 25B, 26A, and 26B.

Figure 25A:
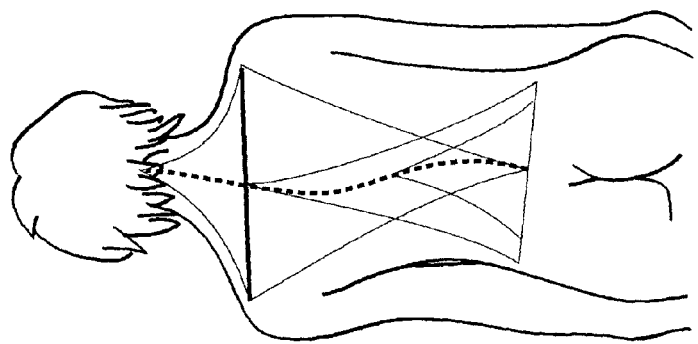
FIG. 25A is a rear view of the upper body of a person.
Figure 25B:
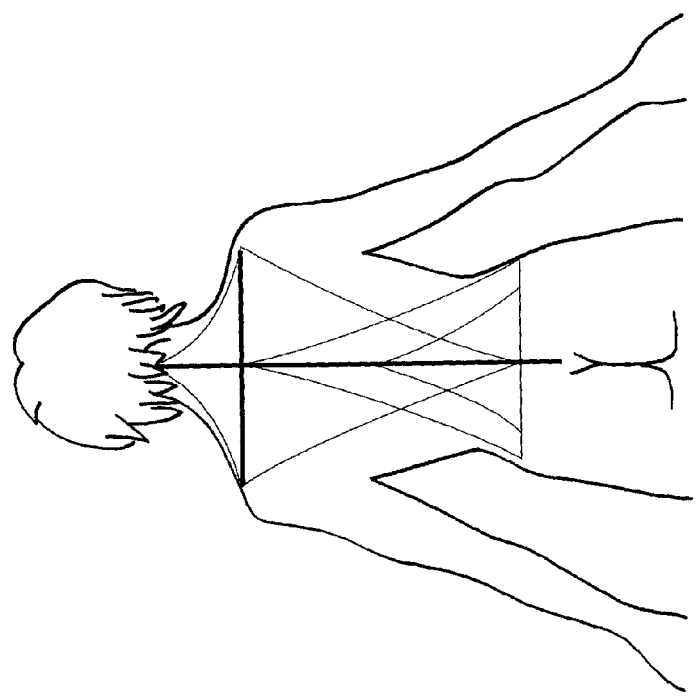
FIG. 25B is another rear view of the upper body of a person.
Figure 26B:
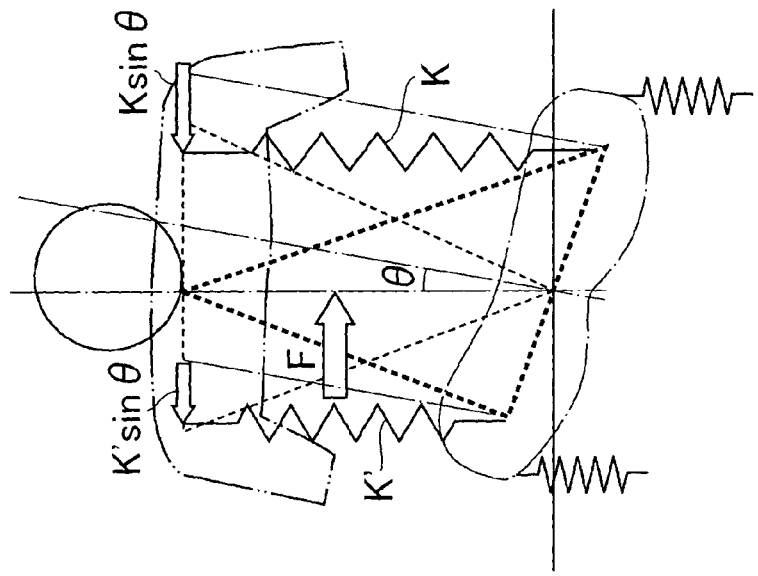
FIG. 26B is another view illustrating support reaction force in the lateral direction by muscle.
Figure 26A:
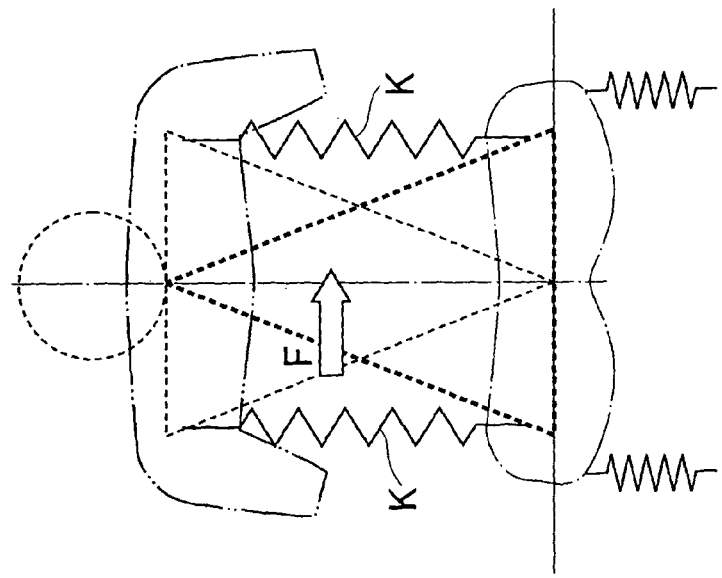
FIG. 26A is a view illustrating support reaction force in a lateral direction by muscle.

FIGS. 25A and 25B are rear views of the upper body of a person. FIGS. 26A are 26B are views illustrating support reaction force in a lateral direction by muscle. FIGS. 25A and 26A are views of a state in which the spine is extended straight, and FIGS. 25B and 26B are views of a state in which the pelvis is rotated in the roll direction of the vehicle such that the spine is curved in an S-shape.

The trunk muscles act as a support spring for supporting the body with respect to external force. When the pelvis is fixed, the pelvis and the shoulders are parallel and the spine extends straight, as shown in FIG. 25A, so the trunk muscles do not function much at all as a support spring with respect to the lateral direction, and the rigidity of the human body in the lateral direction decreases, as shown in FIG. 26A. This is due to the property of muscles in which they only work in the contracting direction. Therefore, when lateral force. F acts on the driver at times such as when the vehicle turns, the driver is unable to withstand this lateral force F by his or her own muscular force. As a result, a large side support for supporting the driver that has received the lateral force F becomes necessary.

With respect to this, when the pelvis rotates, the spine of the driver curves in an S-shape, such that the distance between the pelvis and the shoulder on one side decreases and the distance between the pelvis and the shoulder on the other side increases, as shown in FIG. 25B. When the force of the support spring by the trunk muscles on one side is K', the force of the support spring by the trunk muscles on the other side is K, and the rotation angle of the lumbar spine with respect to a vertical line is $\theta$, a force of $(K'+K) \sin \theta$ acts as a support spring in the lateral direction by the trunk muscles, on the driver. As a result, the support reaction force with respect to the lateral force F markedly increases, so the rigidity of the human body in the lateral direction increases. Therefore, the driver is able to withstand this lateral force F with his or her own muscular force, even without a large side support.

The rigidity of the driver in the lateral direction will increase by the twisting of the trunk muscles not only in a case in which the distance between the scapula and the pelvis changes on the left and right, but also in a case in which the pelvis and the scapula rotate in opposite directions when viewed from above.

As described above, according to the vehicle seat apparatus 1 of this example embodiment, the seat portion 7 is rotatably retained by the seat portion supporting mechanism 9, so the left and right sides of the pelvis of the driver are able to be moved relative to one another in the vertical direction of the vehicle seat apparatus 1 by bending the lumbar spine in the left and right directions. As a result, the driver is able to consciously or unconsciously assume a posture that enables a steering operation to be performed easily, and a posture that can be well maintained when turning, so the ability of the driver to maintain his or her posture is able to be improved. Similarly, the seatback 8 is rotatably retained by the seatback supporting mechanism 12, so the left and right sides of the scapula of the driver are able to be moved relative to one another in the vertical direction of the vehicle seat apparatus 1 by bending the lumbar spine in the left and right directions. As a result, the driver is able to consciously or unconsciously assume a posture that enables a steering operation to be performed easily, and a posture that can be well maintained when turning, so the steering operability by the driver is able to be further improved.

Moreover, after a steering operation is performed and the vehicle has been turned, the seat portion 7 and the seatback 8 that have been rotated are returned to their original positions by the restoring force generated by the seat portion restoring force generating mechanism 40 and the seatback restoring force generating mechanism 50. Therefore, the posture of the occupant is able to be returned to the original state before the steering operation.

Also, rotatably supporting the seat portion 7 in the roll direction and the yaw direction of the vehicle about the rotational axis A by the seat portion supporting mechanism 9 enables the pelvis of the driver to move naturally when a steering operation is performed. As a result, movement of the lumbar region that moves the pelvis using the trunk muscles is able to be performed smoothly. Similarly, rotatably supporting the seatback. 8 in the roll direction of the vehicle about the rotational axis B by the seatback supporting mechanism 12 enables the scapula of the driver to move naturally when a steering operation is performed. As a result, movement of the lumbar region that moves the scapula using the trunk muscles is able to be performed smoothly.

Also, the rotational axis A of the seat portion 7 is set higher at the rear than at the front in the longitudinal direction of the vehicle seat apparatus 1, and so as to pass through an area near the lumbar region of the driver seated in the vehicle seat apparatus 1, so the lumbar spine is able to bend and twist easily. As a result, the steering operability by the driver is able to be further improved. Similarly, the rotational axis B of the seatback 8 is set so as to pass through an area near the chest of the driver seated in the vehicle seat apparatus 1, so the lumbar spine is able to bend and twist even more easily. As a result, the steering operability by the driver is able to be even further improved.

Second Example Embodiment

Next, a second example embodiment of the invention will be described. A vehicle seat apparatus according to the second example embodiment is basically the same as the vehicle seat apparatus according to the first example embodiment, but a seatback supporting mechanism that rotatably supports the seatback differs from the seatback supporting mechanism of the vehicle seat apparatus according to the first example embodiment. Therefore, only the portions of the vehicle seat apparatus of the second example embodiment that differ from those of the vehicle seat apparatus of the first example embodiment will be described below. Descriptions of portions that are the same as those of the vehicle seat apparatus according to the first example embodiment will be omitted.

Figure 27:
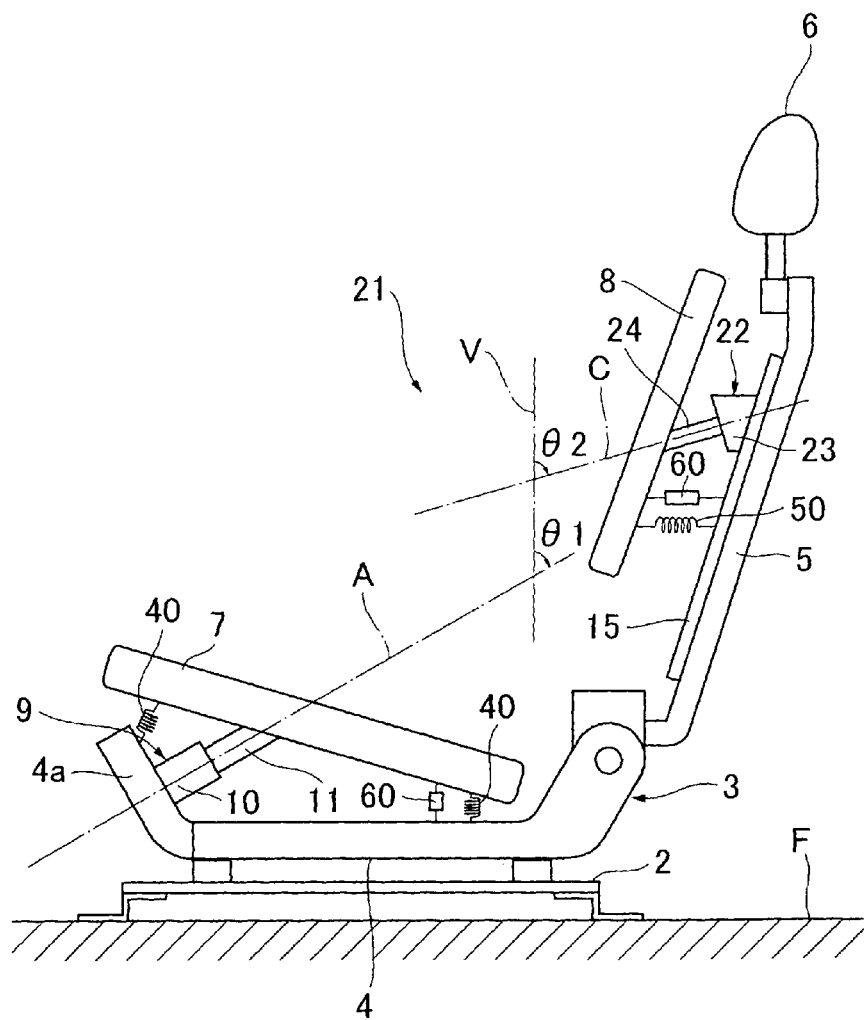
FIG. 27 is a side view schematically showing a vehicle seat apparatus according to a second example embodiment of the invention.

FIG. 27 is a side view schematically showing the vehicle seat apparatus according to the second example embodiment. As shown in FIG. 27, the vehicle seat apparatus 21 according to the second example embodiment is provided with a seatback supporting mechanism 22 that rotatably supports the seatback 8.

In order to rotatably support the seatback 8, this seatback supporting mechanism 22 includes a thrust bearing 23 that is fixed to the second seat frame portion 5 and a thrust shaft 24 that is fixed to the seatback 8 and rotatably connected to the thrust bearing 23. Therefore, a rotational axis C of the seatback 8 according to the seatback supporting mechanism 22 is aligned with a rotational axis of the thrust shaft 24.

The rotational axis C of the seatback 8 is set higher at the rear than at the front in the longitudinal direction of the vehicle seat apparatus 21, and so as to pass through an area near the chest of the driver seated in the vehicle seat apparatus 21. Therefore, the seatback 8 and the scapula that is leaning against the seatback 8 are able to rotate in the roll direction and the yaw direction of the vehicle about the rotational axis C.

The setting of the rotational axis C of the seatback 8 is able to be adjusted by the mounting position of the seatback supporting mechanism 22 with respect to the second seat frame portion 5, and the mounting angle of the seatback supporting mechanism 22 with respect to the second seat frame portion 5. In this case, as shown in the drawings, a slide rail 15 that extends in the vertical direction of the vehicle seat apparatus 21 is mounted to the second seat frame portion 5, and the seatback 8 is able to be mounted to the second seat frame portion 5 via the slide rail 15, so as to be able to slide in the vertical direction of the vehicle seat apparatus 21. Accordingly, the scapula are able to be leaned against the seatback 8, corresponding to differences in the physical build of drivers, so the rotational axis C is able to be easily set such that it passes through an area near the chest of the driver seated in the vehicle seat apparatus 21. Also, the rotational axis C is able to pass through the vertebrae (thoracic vertebrae) of the driver by mounting the seatback supporting mechanism 22 in the center portion, in the lateral direction, of the second seat frame portion 5.

An inclination angle θ2 of the rotational axis C with respect to the vertical line V is not particularly limited. That is, the rotational axis C may be pointed in a direction orthogonal to the intervertebral disks of the lumbar spine or the thoracic vertebrae of the driver seated in the vehicle seat apparatus 21, or the rotational axis C may be pointed in a direction parallel to the rotational axis A.

Also, when the thrust shaft 24 of the seatback supporting mechanism 22 is rotated to the left about the rotational axis C when the vehicle seat apparatus 21 is viewed from the front, the seatback 8 rotates in the roll direction and the yaw direction of the vehicle about the rotational axis C, and assumes a posture such as that described below.

That is, the seatback 8 comes to be in a posture in which the right side of the seatback 8 has moved relatively downward in the vertical direction of the vehicle seat apparatus 21 with respect to the left side of the seatback 8, by the seatback 8 rotating in the roll direction of the vehicle about the rotational axis C. As a result, the scapula of the driver seated against the seatback 8 will rotate in the roll direction of the vehicle about the rotational axis C, such that the driver will come to be in a posture in which the right side of the scapula has moved relatively downward in the vertical direction of the driver with respect to the left side of the scapula. In this example embodiment, the rotation of the seatback 8 and the scapula in the roll direction of the vehicle about the rotational axis C in this way will be referred to as counterclockwise rotation in the roll direction. This counterclockwise rotation refers to a rotational direction of the seatback 8 when the vehicle seat apparatus 21 is viewed from the front.

Also, the seatback 8 comes to be in a posture in which the right side of the seatback 8 has moved relatively backward in the longitudinal direction of the vehicle seat apparatus 21 with respect to the left side of the seatback 8, by the seatback 8 rotating in the yaw direction of the vehicle about the rotational axis C. As a result, the scapula of the driver seated against the seatback 8 will rotate in the yaw direction of the vehicle about the rotational axis C, such that the driver will come to be in a posture in which the right side of the scapula has moved relatively backward in the longitudinal direction of the driver with respect to the left side of the scapula. In this example embodiment, the rotation of the seatback 8 and the scapula in the yaw direction of the vehicle about the rotational axis C in this way will be referred to as clockwise rotation in the yaw direction. This clockwise rotation refers to a rotational direction of the seatback 8 when the vehicle seat apparatus 21 is viewed from above.

In this way, when the seatback 8 rotates in the roll direction and the yaw direction of the vehicle about the rotational axis C, restoring force that returns the seatback 8 to its original position is generated in the seatback restoring force generating mechanism 50. More specifically, the seatback restoring force generating mechanism 50 generates restoring force that tries to rotate the seatback 8 in a direction opposite the rotational direction of the seatback 8, i.e., restoring force that tries to rotate the seatback 8 clockwise in the roll direction and counterclockwise in the yaw direction. Therefore, after a steering operation is performed and the vehicle has been turned, the thrust shaft 24 rotates to the right about the rotational axis C, and the seatback 8 rotates clockwise in the roll direction and counterclockwise in the yaw direction, such that the rotated seatback 8 is returned to its original position, by the restoring force generated by the seatback restoring force generating mechanism 50.

On the other hand, when the thrust shaft 24 of the seatback supporting mechanism 22 is rotated to the right about the rotational axis C when the vehicle seat apparatus 21 is viewed from the front, the seatback 8 rotates in the roll direction and the yaw direction of the vehicle about the rotational axis C; and assumes a posture such as that described below.

That is, the seatback 8 comes to be in a posture in which the left side of the seatback 8 has moved relatively downward in the vertical direction of the vehicle seat apparatus 21 with respect to the right side of the seatback 8, by the seatback 8 rotating in the roll direction of the vehicle about the rotational axis C. As a result, the scapula of the driver seated against the seatback 8 will rotate in the roll direction of the vehicle about the rotational axis C, such that the driver will come to be in a posture in which the left side of the scapula has moved relatively downward in the vertical direction of the driver with respect to the right side of the scapula. In this example embodiment, the rotation of the seatback 8 and the scapula in the roll direction of the vehicle about the rotational axis C in this way will be referred to as clockwise rotation in the roll direction. This clockwise rotation refers to a rotational direction of the seatback 8 when the vehicle seat apparatus 21 is viewed from the front.

Also, the seatback 8 comes to be in a posture in which the left side of the seatback 8 has moved relatively forward in the longitudinal direction of the vehicle seat apparatus 21 with respect to the right side of the seatback 8, by the seatback 8 rotating in the yaw direction of the vehicle about the rotational axis C. As a result, the scapula of the driver seated against the seatback 8 will rotate in the yaw direction of the vehicle about the rotational axis C, such that the driver will come to be in a posture in which the left side of the scapula has moved relatively forward in the longitudinal direction of the driver with respect to the right side of the scapula. In this example embodiment, the rotation of the seatback 8 and the scapula in the yaw direction of the vehicle about the rotational axis C in this way will be referred to as counterclockwise rotation in the yaw direction. This counterclockwise rotation refers to a rotational direction of the seatback 8 when the vehicle seat apparatus 21 is viewed from above.

In this way, when the seatback 8 rotates in the roll direction and the yaw direction of the vehicle about the rotational axis C, restoring force that returns the seatback 8 to its original position is generated in the seatback restoring force generating mechanism 50. More specifically, the seatback restoring force generating mechanism 50 generates restoring force that tries to rotate the seatback 8 in a direction opposite the rotational direction of the seatback 8, i.e., restoring force that tries to rotate the seatback 8 counterclockwise in the roll direction and clockwise in the yaw direction. Therefore, after a steering operation is performed and the vehicle has been turned, the thrust shaft 24 rotates to the left about the rotational axis C, and the seatback 8 rotates counterclockwise in the roll direction and clockwise in the yaw direction, such that the rotated seatback 8 is returned to its original position, by the restoring force generated by the seatback restoring force generating mechanism 50.

Also, the vehicle seat apparatus 21 is preferably provided with a moving direction restricting mechanism, not shown, that restricts movement of the seat portion supporting mechanism 9 and the seatback supporting mechanism 22, such that the seat portion 7 and the seatback 8 rotate in opposite directions from each other when viewed from above. When the seat portion 7 and the seatback 8 rotate in the same direction when viewed from above, the driver may be unable to move the pelvis. Therefore, it is preferable to provide a moving direction restricting mechanism in the vehicle seat apparatus 21 so that the pelvis and shoulders of the driver move optimally from the viewpoint of the theorem of conservation of angular momentum. Also, when a moving direction restricting mechanism is provided in the vehicle seat apparatus 21, the rotational direction in the yaw direction of the seat portion 7 and the pelvis of the driver about the rotational axis A is opposite the rotational direction in the yaw direction of the seatback 8 and the scapula of the driver about the rotational axis C. Therefore, the moving direction restricting mechanism functions as a moving direction restricting portion. The moving direction restricting mechanism may easily be formed using a gear or a wire or the like, for example.

As described above, with the vehicle seat apparatus 21 according to this example embodiment, the driver is able to move the right side and the left side of the scapula relative to one another in the longitudinal direction of the vehicle seat apparatus 21 by bending the lumbar spine in the lateral direction. As a result, the driver is able to consciously or unconsciously assume a posture that enables a steering operation to be performed easily, and a posture that can be well maintained when turning.

Moreover, the seat portion 7 and the seatback 8 rotate in opposite directions from each other when viewed from above, so the driver is always able to move the pelvis and the shoulders in opposite directions in the yaw direction. This posture becomes the optimum movement from the viewpoint of the theorem of conservation of angular momentum of the pelvis and the shoulders, so the steering operability by the driver is able to be further improved.

Also, rotatably supporting the seatback 8 in the yaw direction of the vehicle about the rotational axis C by the seatback supporting mechanism 22 enables the scapula of the driver to move naturally when a steering operation is performed. As a result, movement of the lumbar region that moves the scapula using the trunk muscles is able to be performed smoothly.

Heretofore, example embodiments of the invention have been described, but the invention is not limited to these example embodiments. For example, in the example embodiments described above, both the seat portion 7 and the seatback 8 are described as rotating portions, but the structure may also be such that only one of these is a rotating portion. For example, the structure may be such that only the seat portion 7 is a rotating portion and the seatback 8 is not a rotating portion.

Also, in the example embodiment described above, the seat portion supporting mechanism and the seatback supporting mechanism are formed by a thrust bearing and a thrust shaft, and the seat portion and the seatback are supported in a cantilevered manner by the seat portion supporting mechanism and the seatback supporting mechanism. Alternatively, however, any means may be employed as the structure of the seat portion supporting mechanism and the seatback supporting mechanism and the supporting structure of the seat portion and the seatback, as long as the seat portion and the seatback are able to be rotatably supported.

Also, in the example embodiments described above, the seat portion supporting mechanism and the seatback supporting mechanism are attached to the seat frame, but they may be attached to any location. For example, the seat portion supporting mechanism and the seatback supporting mechanism may be attached directly to a floor of a vehicle, or the like.

Moreover, in the example embodiment described above, the longitudinal and lateral directions of the vehicle are the same as the longitudinal and lateral directions of the vehicle seat apparatus, so the seat portion and the seatback rotate in the roll direction and the yaw direction of the vehicle, but the rotational direction of the vehicle seat apparatus with respect to the vehicle changes depending on the arrangement of the vehicle seat apparatus with respect to the vehicle. For example, when the vehicle seat apparatus is arranged facing the vehicle width direction of the vehicle, the longitudinal direction of the vehicle seat apparatus becomes the lateral direction of the vehicle, and the lateral direction of the vehicle seat apparatus becomes the longitudinal direction of the vehicle. In this case, the right side and the left side of the seat portion and the seatback can be moved in the vertical direction of the vehicle seat apparatus by rotating the seat portion and the seatback in a pitch direction of the vehicle, and the right side and the left side of the seat portion and the seatback can be moved in the longitudinal direction of the vehicle seat apparatus by moving the seat portion and the seatback in the yaw direction of the vehicle.

Also, in the example embodiments described above, relative movement of the right side and the left side of the seat portion and the seatback is performed by rotation of the seat portion and the seatback, but it may be performed by any means as long as the right side and the left side of the seat portion and the seatback are able to be moved relative to one another. For example, the seat portion and the seatback may be divided into a right side and a left side, and the right side and the left side of each of the divided seat portion and seatback may be supported so as to be able to move in the vertical direction and the longitudinal direction of the vehicle seat apparatus. Accordingly, the right side and the left side of the seat portion and the seatback are able to be moved relative to one another in the vertical direction and the longitudinal direction of the vehicle seat apparatus, without rotating the seat portion and the seatback.

Also, in the second example embodiment, the seat portion and the seatback rotate in both the roll direction and the yaw direction, but the structure may also be such that the seat portion and the seatback rotate in only either the roll direction or the yaw direction.

The invention claimed is:

1. A vehicle seat apparatus comprising:
   a seat portion;
   a seatback arranged to a rear of the seat portion;
   a seat portion supporting portion that supports the seat portion such that a right side and a left side of the seat portion are able to move relative to one another in a vertical direction of the vehicle seat apparatus; and
   a seat portion restoring force generating mechanism that generates a restoring force that returns the seat portion to an original position when the seat portion moves;
   a seatback supporting portion that supports the seatback such that a right side and a left side of the seatback are able to move relative to one another in a vertical direction of the vehicle seat apparatus; and
   a seatback restoring force generating mechanism that generates a restoring force that returns the seatback to an original position when the seatback moves;
   wherein
   the seatback supporting portion supports the seatback such that the right side and the left side of the seatback move relative to one another in a longitudinal direction of the vehicle seat apparatus, and
   the seat portion restoring force generating mechanism is an elastic member that is connected to the seat portion and a non-moving portion that supports the seat portion.

2. The vehicle seat apparatus according to claim 1, wherein
   the seat portion supporting portion rotatably supports the seat portion.

3. The vehicle seat apparatus according to claim 1, wherein
   the seat portion supporting portion supports the seat portion such that the right side and the left side of the seat portion move relative to one another in a longitudinal direction of the vehicle seat apparatus.

4. The vehicle seat apparatus according to claim 1, wherein
   a rotational axis of the seat portion, which extends from the seat portion supporting portion, is higher at a rear than at a front in a longitudinal direction of the vehicle seat apparatus.

5. The vehicle seat apparatus according to claim 1, wherein
   a rotational axis of the seat portion, which extends from the seat portion supporting portion, passes through an area near a chest of an occupant seated in the vehicle seat apparatus.

6. A vehicle seat apparatus comprising:
   a seat portion;
   a seatback arranged to a rear of the seat portion;
   a seat portion supporting portion that supports the seat portion such that a right side and a left side of the seat portion are able to move relative to one another in a vertical direction of the vehicle seat apparatus; and
   a seat portion restoring force generating mechanism that generates a restoring force that returns the seat portion to an original position when the seat portion moves;
   a seatback supporting portion that supports the seatback such that a right side and a left side of the seatback are able to move relative to one another in a vertical direction of the vehicle seat apparatus; and
   a seatback restoring force generating mechanism that generates a restoring force that returns the seatback to an original position when the seatback moves;
   wherein the seatback supporting portion supports the seatback such that the right side and the left side of the seatback move relative to one another in a longitudinal direction of the vehicle seat apparatus, and the seatback restoring force generating mechanism is an elastic member that is connected to the seatback and a non-movable member that supports the seatback.

7. The vehicle seat apparatus according to claim 6, wherein
the seat portion restoring force generating mechanism is an elastic member that is connected to the seat portion and a non-moving portion that supports the seat portion.

8. The vehicle seat apparatus according to claim 6, wherein
the seat portion supporting portion rotatably supports the seat portion.

9. The vehicle seat apparatus according to claim 6, wherein
the seat portion supporting portion supports the seat portion such that the right side and the left side of the seat portion move relative to one another in a longitudinal direction of the vehicle seat apparatus.

10. The vehicle seat apparatus according to claim 6, wherein
a rotational axis of the seat portion, which extends from the seat portion supporting portion, is higher at a rear than at a front in a longitudinal direction of the vehicle seat apparatus.

* * * * *